(12) United States Patent
Hou et al.

(10) Patent No.: US 10,005,669 B2
(45) Date of Patent: Jun. 26, 2018

(54) METHOD FOR MASS PRODUCTION OF PHOSPHORIC ACID WITH ROTARY KILN

(71) Applicant: SICHUAN KO CHANG TECHNOLOGY CO., LTD, Chengdu (CN)

(72) Inventors: Yonghe Hou, Chengdu (CN); Shifa Wei, Chengdu (CN)

(73) Assignee: SICHUAN KO CHANG TECHNOLOGY CO., LTD., Chengdu (CN)

( * ) Notice: Subject to any disclaimer, the term of this patent is extended or adjusted under 35 U.S.C. 154(b) by 255 days.

(21) Appl. No.: 14/958,893

(22) Filed: Dec. 3, 2015

(65) Prior Publication Data

US 2016/0152472 A1    Jun. 2, 2016

Related U.S. Application Data

(63) Continuation-in-part of application No. PCT/CN2013/081123, filed on Aug. 9, 2013.

(30) Foreign Application Priority Data

Jun. 4, 2013  (CN) .......................... 2013 1 0218484

(51) Int. Cl.
- *C01B 25/18* (2006.01)
- *C01B 25/12* (2006.01)

(Continued)

(52) U.S. Cl.
CPC ............ *C01B 25/185* (2013.01); *C01B 25/12* (2013.01); *C01B 25/22* (2013.01); *F27B 7/20* (2013.01); *Y02P 20/124* (2015.11)

(58) Field of Classification Search
None
See application file for complete search history.

(56) References Cited

U.S. PATENT DOCUMENTS 2,247,373 A † 7/1941 Hartford
3,091,513 A † 5/1963 Parish
(Continued)

FOREIGN PATENT DOCUMENTS

CN    1054953 A    10/1991
CN    1096273 A  † 12/1994
(Continued)

OTHER PUBLICATIONS

International Search Report in international application No. PCT/CN2013/081123, dated Mar. 6, 2014.
(Continued)

*Primary Examiner* — Wayne Langel
(74) *Attorney, Agent, or Firm* — Syncoda LLC; Feng Ma; Junjie Feng

(57) ABSTRACT

A method for mass production of phosphoric acid with a rotary kiln, comprising the following steps: pretreating raw materials a carbonaceous reductant; preparing the pretreated carbonaceous reductant powder; then evenly mixing the carbonaceous reductant powder and the silica powder to obtain a cladding material; mixing the cores and the cladding material for cladding treatment, drying and solidifying same to obtain composite pellets; sending the composite pellets into a rotary kiln for a reduction reaction; sending the high-temperature slag balls exiting the rotary kiln to a cooling device for comprehensive utilization; introducing the fume containing $P_2O_5$ and fluorine exiting the kiln into a hydration tower for absorbing phosphorus by hydration, then passing same through a phosphoric acid mist capturing tower and a mist removing and separating tower successively, and the fluorine-containing fume discharged from the mist removing and separating tower entering a subsequent fluorine recovery procedure.

19 Claims, 14 Drawing Sheets

(51) Int. Cl.
*C01B 25/22* (2006.01)
*F27B 7/20* (2006.01)

(56) References Cited

U.S. PATENT DOCUMENTS

| | | | | |
|---|---|---|---|---|
| 3,092,473 | A | † | 6/1963 | Koontz |
| 3,273,713 | A | † | 9/1966 | Parish |
| 3,298,679 | A | † | 1/1967 | Krautheim |
| 3,341,289 | A | † | 9/1967 | Hendrickson |
| 3,398,186 | A | † | 8/1968 | Schwartz |
| 3,531,095 | A | † | 9/1970 | Frans |
| 4,615,712 | A | † | 10/1986 | Wen |
| 4,870,913 | A | † | 10/1989 | Schneider |
| 5,322,434 | A | † | 6/1994 | Milewski |
| 7,093,457 | B2 | † | 8/2006 | Foresman |
| 7,378,070 | B2 | † | 5/2008 | Megy |
| 7,910,080 | B2 | † | 3/2011 | Megy |

FOREIGN PATENT DOCUMENTS

| | | | |
|---|---|---|---|
| CN | 101020574 | A | 8/2007 |
| CN | 101049920 | A | 10/2007 |
| CN | 201144150 | Y | 11/2008 |
| CN | 101474523 | A | 7/2009 |
| CN | 202015577 | U | 10/2011 |
| EP | 1021692 | B2 † | 7/2005 |

OTHER PUBLICATIONS

English Translation of the Written Opinion of the International Search Authority in international application No. PCT/CN2013/081123, dated Mar. 6, 2014.
Chen, Shanji, Process features and prospect for kiln-process phosphoric acid production, Inorganic Chemicals Industry, Jun. 2009, vol. 41, No. 6, pp. 1-3 and 13, ISSN 1006-4990, mailed in Jun. 2009.
Levin et al, Phase Diagrams for Ceramists, Compiled at the National Bureau of Standards, Fig. 318 (The American Ceramic Society, Inc., Third Ed. 1974).†
Perry's Chemical Engineers' Handbook, Sixth Edition, pp. 20-33 to 20-37 (McGraw-Hill 1984).†
Raymond D. Potts, Induration of Taconite Pellets Using a Grate-Kiln System at Minntac, Skilling Mine Review, pp. 4-9 (Aug. 17, 1991).†
Metso, Grate-Kiln Iron Ore Pelletizing System, pp. 1-8 (2010).†
James L. Green, A Comparison of Grinding Mills in Grinding Phosphate Rock, Society of Mining Engineers, pp. 401-404 (Dec. 1963).†
Perry's Chemical Engineers' Handbook, Sixth Edition, pp. 8-52, 8-53, 8-57, and 8-58 (McGraw-Hill 1984).†
George C. Pedersen, The State of the Art in Gas Cleaning for the Fertilizer Industry, pp. 1-15 (Presented at Arab Fertilizer Association 2001).†
H.Y. Allgood et al., Design of Equipment to Produce Phosphoric Acid from Elemental Phosphorous, pp. 1-35 (Tennessee Valley Authority Jun. 1970).†
H.Y. Allgood et al., Superphosphoric Acid Plant, Industrial and Engineering Chemistry, vol. 59, pp. 18-28 (Jun. 1967).†
John R. Van Wazer, Phosphorus and It's Compounds, In Two Volumes Volume II: Technology, Biological Functions, and Applications, pp. 1212 (Interscience Publishers, Inc., New York 1961).†
M.M. Striplin, Chemical Engineering Report No. 2, Development of Processes and Equipment for Production of Phosphoric Acid, Wilson Dam, Alabama, pp. 1-16, 30-78 (Tennessee Valley Authority 1948).†
Yin Xianguo, Discussion of the Current Trial Production of CDK Kiln-Method Phosphoric Acid Technology in China, Phosphate and Compound Fertilizer, vol. 22(1), pp. 33-35 (Translation pp. 1-8) (Jan. 2007).†
Leder et al., New Process for Technical-Grade Phosphoric Acid, in Ind. Eng. And Chem. Process Design and Development 24(3), pp. 688-697 (American Chemical Society 1985).†
J.H. Walthall and M.M. Striplin, Superphosphoric Acid by Absorption of Phosphorus Pentoxide Vapor, Industrial and Engineering Chemistry, vol. 33, No. 8, pp. 995-1000 (Aug. 1941).†
U.S. Environmental Protection Agency AP42, Fifth Edition, vol. I, Inorganic Chemical Industry, Chapter 11: Mineral Products Industry, 11.21 Phosphate Rock Processing, pp. 11.21-1 to 11.21-10 (1993).†
Perry's Chemical Engineers' Handbook, Sixth Edition, pp. 8-20 to 8-52 (McGraw-Hill 1984).†
U.S. Environmental Protection Agency AP42, Fifth Edition, vol. I, Inorganic Chemical Industry, Chapter 8, Jul. 1993 (Reformatted Jan. 1995); Section 8.9 Phosphoric Acid, pp. 8.9-1-8.9-8.†
P.A. Sychkov, et al, Not Fuel Using of Brown Coal, pp. 1-10 (Oil and Gas Business 2009).†
W. Douglas Belle, Fertilizer Industry: Fertilizer Development & Environmental Protection, FSA Recovery from Phosphoric Acid Evaporators, pp. 1-3, 5, 7, 8 (Arab Fertilizer Association 2008).†
Paul A. Smith, History of Fluorine Recovery Processes, pp. 1-20 (IFA Technical Sub-Committee and Committee Meeting Sep. 15-17, 1999, Novgorod, Russia).†
European Fertilizer Manufacturers' Association, Best Available Techniques for Pollution Prevention and Control in the European Fertilizer Industry Booklet 4 of 8: Production of Phosphoric Acid, pp. 1-44 (2000).†
John Munroe Craig, Fluoride Removal From Wet-Process Phosphoric Reactor Gases, pp. 1-201 (University of Florida 1970).†

† cited by third party a rotation direction of an agitator a rotation direction of a casing and a base of a mixing barrel

METHOD FOR MASS PRODUCTION OF PHOSPHORIC ACID WITH ROTARY KILN

CROSS-REFERENCE TO RELATED APPLICATIONS

The application is a continuation in part of PCT/CN2013/081123 (filed on Aug. 9, 2013), which claims priority of CN Patent Application Serial No. 201310218484.2 (filed on Jun. 4, 2013) the contents of which are incorporated herein by reference in their entirety.

TECHNICAL FIELD

The present invention relates to a raw material pretreating method and apparatus in a phosphoric acid-producing process, and particularly to a raw material pretreating method and a pretreating process system in a kiln phosphoric acid (KPA) process.

BACKGROUND

At present, there are chiefly two processes for producing phosphoric acid in industry. (1) producing phosphoric acid with a wet process: using sulfuric acid to decompose phosphate ore to obtain dilute phosphoric acid and solid slag (briefly called phosphogypsum) with $CaSO_4.nH_2O$ as a main component, and concentrating the dilute phosphoric acid to obtain wet-process phosphoric acid with about 54% phosphoric acid. This process has the following major drawbacks: the first drawback is large consumption of sulfuric acid; the second drawback is that the slag phosphogypsum cannot be used effectively, and sulfuric acid, phosphoric acid and soluble fluorides entrained therein are all soluble in water, and rain wash of the slag piled in the nature is apt to cause serious pollution to the environment; the third drawback is that the resultant phosphoric acid contains higher contain of impurities and is generally only used to produce fertilizer; and the fourth drawback is that high-grade phosphate ore must be used to ensure economy of the product. (2) producing phosphoric acid with a hot process: first, placing phosphate ore, silica and carbonaceous solid reductant in an ore-smelting electric furnace, raising a temperature in the furnace to 1300° C. with energy of electric arc formed by electrical short-circuiting, reducing phosphor in the phosphate ore in the form of $P_4$, meanwhile converting carbonaceous solid reductant into CO, washing gas mainly containing $P_4$ and CO discharged out of the ore-smelting electric furnace with water, cooling $P_4$ into solid to separate from gas phase to obtain the product yellow phosphorus, igniting and burning exhaust gas containing CO at an outlet of a chimney and exhausting to the atmosphere; heating the obtained $P_4$ to 80° C. to change it into liquid phase, subjecting it to oxidization combustion reaction with introduced air in a hydration tower to obtain phosphoric anhydride $P_2O_5$, and then absorbing it with water to obtain phosphoric acid. The hot-process production of phosphoric acid has the following main drawbacks: the first drawback is large consumption of electrical energy; the second drawback is that gas discharged out of the ore-smelting electric furnace, from which $P_4$ is already separated, still entrains a large amount of fluorides (existing in the form of $SiF_4$ and HF) and a small amount of un-deposited gas $P_4$, which causes serious pollution to the atmospheric environment; the third drawback is that gas containing a large amount of CO is directly burnt and exhausted, which causes large waste of energy; the fourth drawback is that high-grade phosphate ore needs to be used to ensure economy of the production.

To overcome impact on production of phosphoric acid exerted by shortage of electrical energy, insufficient pyrites resources and gradual reduction of high-grade phosphate core, Occidental Research Corporation of the United States proposed a KPA process in 1980's, i.e., a process of producing phosphoric acid with a rotary kiln (briefly called a phosphoric acid producing process with a kiln) (see Frederic Ledar and Won C. Park, et al., New Process for Technical-Grade Phosphoric Acid, Ind. Eng. Chem. Process Des. Dev 1985, 24, 688-697), and carried out a pilot experiment of a pilot device in a 0.84 m (inner)×9.14 m (see the US patent document U.S. Pat. No. 4,389,384). According to this process, phosphate ore, silica and carbonaceous reductant (coke powder or coal powder) are co-ground so that 50%-85% of the co-ground materials passes a −325 mesh, with 1% bentonite being added to produce balls, which are dried and preheated by a chain-type dryer and then delivered into a rotary kiln with a kiln head in which natural gas is burnt, pellets are reduced in the kiln, a maximum solid temperature is controlled as 1400-1500° C., pellet $CaO/SiO_2$ mole ratio is adjusted as 0.26-0.55 so that the a melting point of the pellet is higher than a carbon thermal reduction temperature of the phosphate core in the pellets, phosphor is reduced and volatiles out of the pellets in the form of phosphoric vapor, and then oxidized by air introduced in a middle space of the kiln into phosphorous pentoxide, heat resulting from oxidization is then supplied to the reduction reaction, and finally kiln gas containing phosphorous pentoxide is hydrated and absorbed to obtain phosphoric acid.

The idea of the above processing phosphoric acid with a kiln exhibits an excellent industrial application prospect because its principle is to form $P_4$ gas using carbon thermal reduction of the phosphate ore, transfer phosphorus in the phosphate ore to gas phase of the rotary kiln, use a gas-solid separation principle to enable phosphorus to be well separated from other solid substances in the balls, allow the $P_4$ gas transferred into the gas phase of the rotary kiln to go through an oxidization heat liberation reaction with oxygen in the gas phase of the rotary kiln to generate $P_2O_5$, supply the liberated heat to carbon thermal reduction (endothermic reaction) of the phosphate ore in the material balls, and finally hydrate and absorb the kiln gas containing $P_2O_5$ exiting the rotary kiln to obtain industrial phosphoric acid having a cleanliness much higher than the phosphoric acid produced with the wet process. Since the rotary kiln uses primary energy to maintain phosphate ore carbon terminal reduction temperature, and meanwhile flammable substance $P_4$ generated from the phosphate ore carbon terminal reduction and CO are subjected to the combustion heat liberation reaction in the interior of the rotary kiln to replenish the energy needed to maintain the phosphate ore carbon terminal reduction temperature in the rotary kiln, this process substantially reduces energy consumption as compared with the conventional hot process of producing phosphoric acid.

However, the research indicates that it is very difficult to implement the process of producing phosphoric acid with the kiln in large-scale industrial application and practice and its main drawbacks are as follows:

1. A rotary kiln is an apparatus with a kiln body rotating at a certain speed (0.5 r/min-3 r/min), and it is advantageous in continuously performing mechanical turn and mixture of a solid material fed into the kiln to ensure uniformity of heat reception of the solid material at all locations in the kiln. However, the solid material in the kiln must bear a mechanical frictional force resulting from movement of the material.

If a strength of the material is smaller than the received mechanical frictional force, the material can be easily destroyed. A basic principle of the KPA process proposed by ORC corporation of the United States is to co-grind the phosphate ore, the silica and the carbonaceous reductant (coke powder or coal powder) so that 50%-80% of the co-ground materials passes 325 mesh, and then produce them into pellets, the three kinds of substances must be closely copolymerized into a whole so that the mixture does not melt at the carbon thermal reduction temperature of the phosphate ore under the condition the $CaO/SiO_2$ mole ratio in the mixture is 0.26-0.55, and meanwhile carbon reduction of the phosphate ore can be performed smoothly. However, since the reductant carbon is added to the material pellets used in the process, carbon goes through quick oxidation reaction with oxygen in air at a temperature greater than 350° C. to produce $CO_2$. If a conventional method of consolidating pellets at a high temperature (≥900° C.) at a chain grate in the metallurgical industry is employed, the reducing carbon in the pellets will be all oxidized, the pellets entering the rotary kiln will lose the reductant, carbon thermal reduction reaction of the phosphorus naturally cannot be performed, and the process fails as a result. If only the bentonite is added as a bonding agent of the pellets to perform drying and dehydration at a temperature less than 300° C., an anti-pressure strength of the pellets is only about 10 KN per ball, with a falling strength 1 time per meter; since an acting mechanism of the bentonite is mainly to use interlayer water in its substance structure to adjust a moisture content release speed during the drying of the pellets and improve a burst temperature of the pellets during the drying, and bentonite itself does not play a remarkable role in improving the strength of the pellets. After such pellets are fed into the rotary kiln and before the rotary kiln temperature value reaches 900° C., since the pellets entering the kiln cannot bear the mechanical frictional force resulting from movement of material balls in the pellets, a lot of said pellets are pulverized, and thereafter the phosphate ore powder, silica powder and carbonaceous reductant forming the pellets will separate, the phosphate ore powder after pulverization causes failure of reduction of phosphorus as it cannot get in close contact with carbonaceous reductant. More seriously, once the phosphate ore powder separates from silica powder, its melting point abruptly falls below 1250° C. When such powder-like phosphate ore passes through a high-temperature reducing area (with a material layer temperature of 1300° C. or so) of the rotary kiln, it will totally changes from solid phase into a liquid phase, and thereby adheres to a liner of the rotary kiln to form high-temperature ringing of the rotary kiln, which hinders normal rotation of the materials in the rotary kiln so that a majority of materials added into the rotary kiln overflows from the rotary kiln from a feeding end of the rotary kiln, high-temperature reduction of phosphorus cannot be achieved and the process fails. It can be seen that the raw materials entering the kiln have their intrinsic drawbacks, any industrialized, large-scale or commercialized application of the above-mentioned KPA technology has not yet been witnessed so far.

2. Regarding the KPA process with the phosphate ore pellets with carbon being added, a solid material area below a material layer in the rotary kiln belongs to a reduction zone, and a gas flow area of the rotary kiln is above the material layer and belongs to an oxidization zone, the feed pellets are added from a kiln tail of the rotary kiln and discharged out of a kiln head of the rotary kiln by virtue of its own gravity and a frictional force resulting from rotation of the rotary kiln, a burner for burning fuel in the rotary kiln is mounted at the kiln head of the rotary kiln, fume resulting from the burning is introduced out by a blower at the kiln tail, a micro negative pressure is maintained in the rotary kiln, and the gas flow is opposite to a movement direction of the materials. Since there is not a mechanical isolation area between the reduction zone (solid material layer area) and the oxidization zone (the gas flow area above the solid material layer area of the rotary kiln) of the rotary kiln, the material balls exposed on the surface of the solid material layer area and $O_2$, $CO_2$ in the gas flow in the oxidization zone are subjected to convective mass transfer; on the one hand, this causes the reductant in the material balls to be partially oxidized before the material balls are heated by the gas flow heat transfer to the carbon reduction temperature of the phosphate ore so that the material balls are not sufficiently reduced due to shortage of carbonaceous reductant in the reduction zone of the rotary kiln; more seriously, the material balls exposed to the surface of the material layer at the high-temperature area of the rotary kiln is further subjected to chemical reaction with $P_2O_5$ already generated from reduction in the kiln gas to produce calcium metaphosphate, calcium phosphate and other metaphosphates or phosphates, thereby causing the phosphorus already reduced into the gas phase to return to the material balls again and form a layer of white crust rich in $P_2O_5$ on the surface of the material balls, the layer of crust generally having a thickness of 300 μm-1000 μm, the content of $P_2O_5$ in the layer of crust topping 30%; as a result, $P_2O_5$ transferred from the material balls to the gas phase does not exceed 60%, which cause a lower yield ratio of $P_2O_5$ in the phosphate ore and thereby causes waste of mineral resources and large rise of the phosphoric acid production cost so that the above KPA process losses value in respect of commercial application and industrial spread. Researchers desire gas volatized from the material layer to isolate the reduction zone from the oxidization zone in the rotary kiln, but industrial experiments performed in a rotary kiln with an inner diameter 2 m show that the phenomena of white crust rich in $P_2O_5$ on the surface of the pellets still cannot be avoided.

Due to the above-mentioned technical drawbacks, it is still very difficult to use the KPA process proposed by ORC Corporation in large-scale industrial application and practice to produce phosphoric acid.

Joseph A. Megy proposes some improved technical methods with respect to the KPA process (see US patent document U.S. Pat. No. 7,910,080B), i.e., on the premise of maintaining the basis process of KPA unchanged, providing a material stopping ring on a kiln head material discharging end of the cylinder of the rotary kiln to improve a solid material filling rate of the rotary kiln, and meanwhile increasing the diameter of the rotary kiln to reduce a surface area to volume ratio of an inner material layer of the rotary kiln, reduce probability of the material of the material layer being exposed to the surface of the solid material layer to shorten the time that the reductant carbon in the material balls is oxidized by $O_2$ in the kiln gas in the rotary kiln, reduce burn of the reductant carbon before the material balls reach the reduction zone of the rotary kiln and meanwhile decease generation of phosphates or metaphosphates on the surface of the material balls in the high-temperature area of the rotary kiln. In addition, according to the process, it is desired that partial petrol coke is added to the materials entering the rotary kiln so that reducing gas generated by a volatile matter in the petrol coke due to heat reception and volatilization is used to cover between the material layer and the gas flow oxidization area of the rotary kiln to further block the probability of the $O_2$ and $P_2O_5$ in the gas flow in the rotary kiln reacting with the material balls to ensure normal operation of the process. However, increase of the filling rate of the rotary kiln allows the material balls to bear larger mechanical frictional force in the rotary kiln, thereby causing a larger proportion of pulverization of the material balls in the rotary kiln, and forming more substances with a melting point lower than the phosphate ore carbon thermal reduction temperature so that the high-temperature ringing of the rotary kiln becomes quicker and more serious and earlier failure of the process is caused. In addition, the volatile matter generated by added small amount of petrol coke is not sufficient to produce sufficient gas and it is difficult to form an effective isolation layer between the solid material layer of the rotary kiln and the gas flow area in the rotary kiln. If an excessive amount is added, the materials in the rotary kiln will entrain a large amount of fuel so that in a slag ball cooling machine in the subsequent process, the redundant fuel is confronted with the air for cooling the slag balls and burns rapidly, a large amount of heat resulting from the burning not only increases the difficulty in cooling the high-temperature slag balls exiting the rotary kiln but also substantially increases the production cost of the process and makes implementation of the commercialized and large-scale application of the process impossible.

However, in subsequent research, we have found a series of new technical problems. These technical problems includes: (1) in the raw material pretreating stage, the process cost and energy consumption is relatively high, components of the raw materials fed into the rotary kiln fluctuates greatly, mixing of the raw materials is not uniform enough, and this further makes high-temperature ringing of powder materials in the rotary kiln more serious; 2) mechanics performance and mechanical strength of the composite pellets as the process raw material are not stable enough, there are not optional industrial apparatus and suitable drying method for dying composite pellets, burst and cracking are apt to occur during the drying of pellets, and cracked composite pellets enter the rotary kiln and are pulverized at a high-temperature reduction zone in the rotary kiln to form a ring; 3) in a process reaction phase, the generated metaphosphoric acid reacts with dust in the kiln gas to generate complicated metaphosphate at the kiln tail of the rotary kiln, and gradually forms a kiln tail ring in the cylinder at the kiln tail of the rotary kiln and seriously reduces an operation efficiency of the rotary kiln; 4) during the cooling and recovery stage, an effect of cooling high-temperature slag balls which exits the rotary kiln and whose $P_2O_5$ is totally released is to be improved, thermal energy resulting from the cooling is not utilized reasonably and effectively, and waste of resource and energy during cooling is relatively serious; 5) during subsequent phosphoric acid producing stage, the amount of fume in thermal process for producing phosphoric acid is small, a fume flow speed of the apparatus is low, the apparatus system is rather massive and structurally complicated, and the cost for investment and operation is relatively high; content impurities in the fume of the kiln phosphoric acid process is complicated, the fume exiting the kiln also contains fluorine-containing substance (existing in the form of $SiF_4$ and HF) harmful to the human body, it needs to be recovered and meanwhile pollution to the environment is avoided.

Hence, to solve a series of technical problems in the current kiln phosphoric acid process and carry out long-period product in a more stable, more energy-saving, more environment-friendly, low-cost and highly efficient manner, the current kiln phosphoric acid whole process need to be modified and improved by those skilled in the art.

SUMMARY

The technical problem to be solved by the present invention is to overcome drawbacks in the prior art and provide an improved method for mass producing phosphoric acid with a rotary kiln, wherein the process flow is reasonable and optimized, the equipment investment is low, the economic added value is high, the whole process is energy-saving, environmentally friendly and efficient, and the product quality is excellent.

To solve the above technical problem, the technical solution proposed by the present invention is an improved method for mass producing phosphoric acid with a rotary kiln, comprising the following steps:

(1) Raw material pretreatment: pretreating raw materials carbonaceous reductant, phosphate ore and silica respectively;

(2) Preparation of inner balls: the carbonaceous reductant powder, phosphate ore powder and silica powder obtained after treatment in step (1) and a binding agent are mixed according to a proportional requirement, a mixed material is fed into a pelleting machine for pelleting treatment, and inner balls are obtained upon completion of the pelleting;

(3) Forming of composite pellets: the carbonaceous reductant powder and silica power after treatment in step (1) and a binding agent are mixed according to proportional requirements to obtain a cladding material; the inner balls obtained in step (2) are subjected to screening treatment to obtain inner balls with a granularity meeting the process requirement, said inner balls are fed into another pelleting machine for cladding treatment, the cladding material is introduced in said pelleting machine, composite green pellets are obtained upon completion of the cladding treatment; the composite green pellets are delivered into a dryer for drying and solidification and are finally formed to obtain the composite pellets;

(4) Kiln reduction: the composite pellets obtained in step (3) is enabled to enter a cavity of the rotary kiln, the composite pellets in the rotary kiln is reduced by the reductant at a high temperature to generate kiln fume, an outlet flue is arranged in a way that the fume exiting the kiln at the kiln tail of the rotary kiln does not deviate much in a movement direction upon entering the outlet flue;

(5) Absorption of phosphorus by hydration: the fume exiting the kiln containing $P_2O_5$ and fluorine is introduced into the hydration tower, a concentrated phosphoric acid solution sprayed downwardly comes in sufficient reverse-flow contact with the fume exiting the kiln, entering the tower and containing $P_2O_5$ and fluorine for mass transfer and heat transfer, $P_2O_5$ in the fume is subjected to chemical reaction with water in the sprayed concentrated phosphoric acid solution to produce phosphoric acid.

LISTING OF REFERENCE NUMBERS

Figure 1:
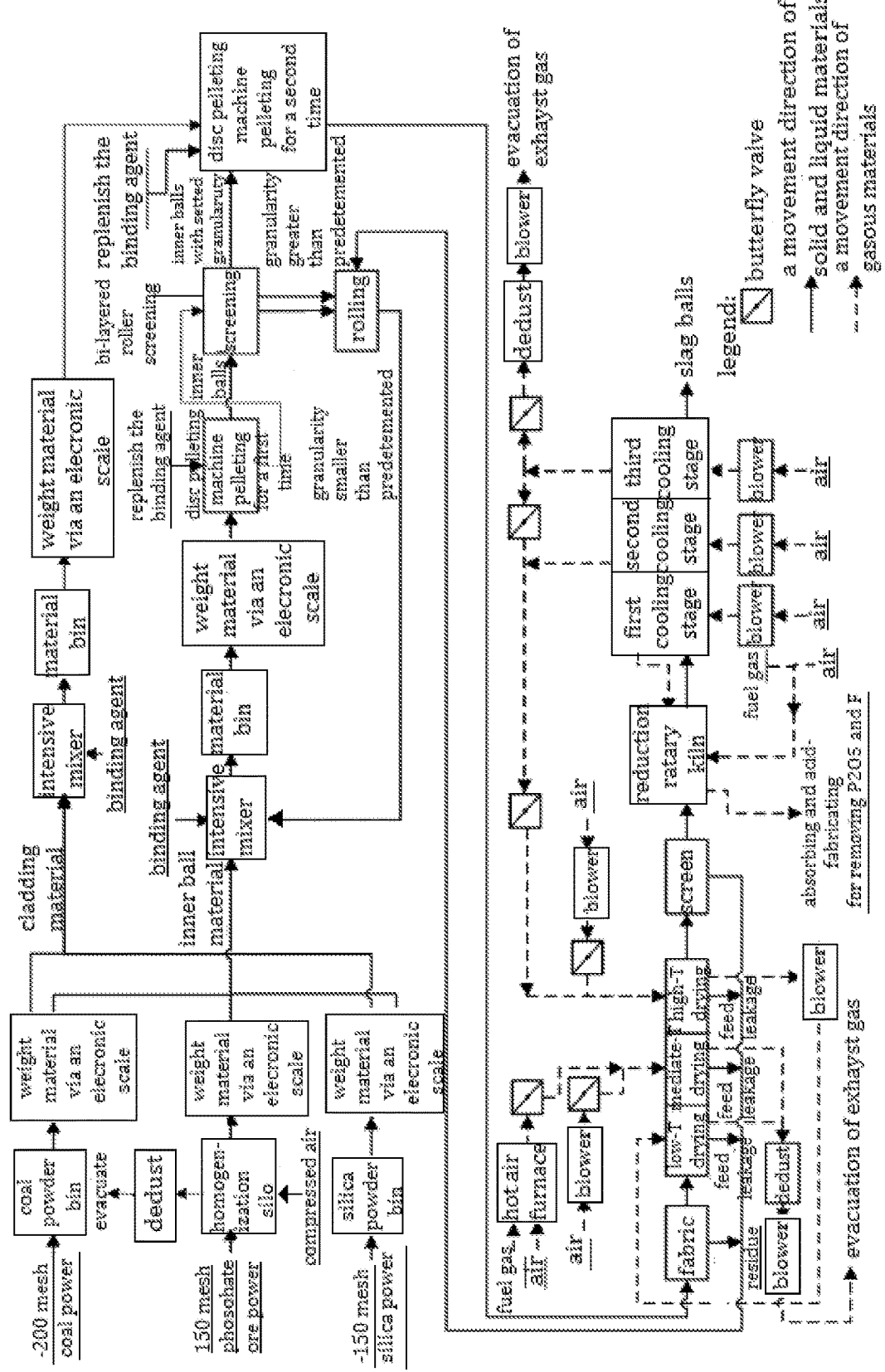
FIG. 1 is a schematic diagram of a process flow of mass producing phosphoric acid with a rotary kiln in a specific embodiment of the present invention.

The reference number 1 denotes a hydration tower, 11 a fume inlet; 12 a fume outlet; 13 a spraying device; 14 a liquid inlet; 15 a liquid outlet; 16 an acid solution storage tank; 17 a water-cooling system; 18 an acid cooler; 2 a circulating pump; 21 a filter-pressing device; 22 a filler filtering device; 23 a phosphoric acid refining apparatus; 24 a concentrated phosphoric acid spraying layer; 25 a dilute phosphoric acid spraying layer; 3 a phosphoric acid mist capturing tower; 31 a washing pipe; 32 a separation tank; 33 an acid solution outlet; 34 an acid solution inlet; 35 a nozzle; 4 a mist removing and separating tower; 41 an online water-washing device; 42 a wire mesh demister; 43 a housing; 44 a cold air inlet; 45 a first hot air outlet; 46 a second hot air outlet; 47 a partition plate; 48 a chimney; 49 high-temperature slag balls; 5 a primary fluorine absorbing tower; 51 a fluosilicic acid washing pipe; 52 a fluosilicic acid separating tank; 53 a fluosilicic acid solution outlet; 54 a fluosilicic acid refining apparatus; 55 a fuel burner; 56 a silicon carbide material layer; 57 a clay material layer; 58 a high alumina material layer; 6 a secondary fluorine absorbing tower; 61 a secondary fluosilicic acid washing pipe; 62 a secondary fluosilicic acid separating tank; 63 a fluosilicic acid cooler; 7 an exhaust gas absorbing tower; 71 a driving member; 72 a feed hopper; 73 an agitator; 74 a casing; 75 a material turning plough; 76 a discharge port; 77 a material loading cart; 78 a drying furnace body; 79 a deduster; 8 a blower; 80 a low-temperature drying stage; 81 an intermediate-temperature drying stage; a high-temperature drying stage; 83 an air inlet; 84 a temperature-preserving layer; 85 an air outlet; 86 an air vent; 90 a transmission gear; 91 a kiln head box; 92 a supporting wheel device; 93 a kiln body; 94 a transmission pinion; 95 a driving device; 96 a kiln tail box; 97 an outlet flue; 98 a feed pipe; 99 a kiln tail dynamic seal; 100 a kiln head dynamic seal; 101 a kiln liner; 102 a cylinder casing; 103 a travel decelerating motor; 104 a machine frame; 105 a rotation shaft; 106 a supporting truss; 107 a rotary kiln door frame; 108 a platform; 109 wheel; 110 a scraper; 111 a supporting device; 112 a trolley; 113 thermocouple; 114 air pump.

DETAILED DESCRIPTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

In an embodiment of the present invention, an improved method for mass producing phosphoric acid with a rotary kiln, comprising the following steps:

(1) Raw material pretreatment: pretreating raw materials carbonaceous reductant, phosphate ore and silica respectively;

(2) Preparation of inner balls: the carbonaceous reductant powder, phosphate ore powder and silica powder obtained after treatment in step (1) and a binding agent are mixed according to a proportional requirement, a mixed material is fed into a pelleting machine for pelleting treatment, and inner balls are obtained upon completion of the pelleting;

(3) Forming of composite pellets: the carbonaceous reductant powder and silica power after treatment in step (1) and a binding agent are mixed according to proportional requirements to obtain a cladding material; the inner balls obtained in step (2) are subjected to screening treatment to obtain inner balls with a granularity meeting the process requirement, said inner balls are fed into another pelleting machine for cladding treatment, the cladding material is introduced in said pelleting machine, composite green pellets are obtained upon completion of the cladding treatment; the composite green pellets are delivered into a dryer for drying and solidification and are finally formed to obtain the composite pellets;

(4) Kiln reduction: the composite pellets obtained in step (3) is enabled to enter a cavity of the rotary kiln, the composite pellets in the rotary kiln is reduced by the reductant at a high temperature to generate kiln fume, an outlet flue is arranged in a way that the fume exiting the kiln at the kiln tail of the rotary kiln does not deviate much in a movement direction upon entering the outlet flue;

(5) Absorption of phosphorus by hydration: the fume exiting the kiln containing $P_2O_5$ and fluorine is introduced into the hydration tower, a concentrated phosphoric acid solution sprayed downwardly comes in sufficient reverse-flow contact with the fume exiting the kiln, entering the tower and containing $P_2O_5$ and fluorine for mass transfer and heat transfer, $P_2O_5$ in the fume is subjected to chemical reaction with water in the sprayed concentrated phosphoric acid solution to produce phosphoric acid.

In an embodiment of the present invention, in said step (1) the raw material pretreatment comprises: pretreating raw materials carbonaceous reductant, phosphate ore and silica respectively with a carbonaceous reductant pretreatment system, a phosphate ore pretreatment system and a silica pretreatment system.

In an embodiment of the present invention, a process procedure of the carbonaceous reductant pretreating system comprises: crushing the carbonaceous reductant to below 30 mm (preferably 6 mm-30 mm) in granularity by a single-stage crushing device, and then delivering the crushed material to a carbonaceous reductant intermediate bin which delivers the crushed material to an ore grinding device via a weighing and feeding device for grinding; after the ore grinding device grinds the fed material to a granularity meeting a process requirement (generally over −100 mesh, preferably −200 mesh to −325 mesh), the powder material is collected by a combined dust collector comprised of a cyclone powder-collecting device and a pouch powder-collecting device (or collected individually by a pouch powder-collecting device) and delivered to the carbonaceous reductant powder storage bin; hot air is replenished constantly via a configured hot air furnace during grinding so as to remove moisture content entrained in the powder material.

In an embodiment of the present invention, a process procedure of the phosphate ore pretreating system comprises: crushing the phosphate ore to below 30 mm (preferably 6 mm-30 mm) in granularity by a single-stage crushing device, and then delivering the crushed material to a phosphate ore intermediate bin which delivers the crushed material to an ore grinding device via a weighing and feeding device for grinding; after the ore grinding device grinds the fed material to a granularity meeting a process requirement (generally over −100 mesh, preferably −100 mesh to −200 mesh), the powder material is collected by a combined dust collector comprised of a cyclone powder-collecting device and a pouch powder-collecting device (or collected individually by a pouch powder-collecting device) and delivered to a homogenization silo; hot air is replenished constantly via a configured hot air furnace during grinding so as to remove moisture content entrained in the powder material.

In an embodiment of the present invention, a process procedure of the silica pretreating system comprises: crushing silica to below 30 mm (preferably 6 mm-30 mm) in granularity by a single-stage crushing device or a dual-stage one-closed-loop crushing device, and then delivering the crushed material to a silica intermediate bin which delivers the crushed material to an ore grinding device via a weighing and feeding device for grinding; after the ore grinding device grinds the fed material to a granularity meeting a process requirement (generally over −100 mesh, preferably −100 mesh to −200 mesh), the powder material is collected by a combined dust collector comprised of a cyclone powder-collecting device and a pouch powder-collecting device and delivered to a silica powder storage bin; hot air is replenished constantly via a configured hot air furnace during grinding so as to remove moisture content entrained in the powder material.

In an embodiment of the present invention, in said step (1), the single-stage crushing device employs a hammer-type crusher or an impact type crusher, or employs a combined type crusher comprising a hammer type crusher and an impact type crusher; the dual-stage one-closed-loop crushing device mainly comprises a jaw crusher, a screening machine and a cone crusher which are connected in turn, and a discharge port of the cone crusher is cyclically connected to a feed port of the screening machine; and/or, the ore grinding device in the carbonaceous reductant pretreatment system employs a vertical grinder or an air swept mill; the ore grinding device in the phosphate ore pretreatment system employs a vertical grinder or an air swept mill; the ore grinding device in the silica pretreatment system employs a ball grinder and/or a high-pressure roller press; and/or, the homogenization silo is a gap type homogenization silo or a continuous homogenization silo, the homogenization silo employs compressed air to stir the powder material in the silo uniform with a homogenization value greater than or equal to 4.

In an embodiment of the present invention, in said step (2) the preparation of inner balls comprises: the carbonaceous reductant powder, phosphate ore powder and silica powder obtained after treatment in step (1) are added to an intensive mixer or a damp mill according to a proportional requirement, and meanwhile a binding agent is added, the mixed material which is mixed sufficiently and uniformly is fed by a weighing and feeding device into a pelleting machine for pelleting treatment, the binding agent is additionally added in an application form of droplets and/or mist, an addition amount of the binding agent is 1%-10% of mass of the mixed material, and inner balls are obtained upon completion of the pelleting.

In an embodiment of the present invention, in said step (3) the forming of composite pellets comprises: the carbonaceous reductant powder and silica power after treatment in step (1) are added to another intensive mixer according to proportional requirements, meanwhile a binding agent is added, and they are mixed sufficiently to obtain a cladding material; inner balls obtained in step (2) are subjected to bi-layered roller-type screening treatment to obtain inner balls with a granularity meeting the process requirement, said inner balls are fed into another pelleting machine for cladding treatment, the cladding material is introduced by an electronic weighing and feeding device in said pelleting machine according to a corresponding proportion set with respect to the inner ball material, the binding agent is additionally added in an application form of droplets and/or mist during the cladding treatment, the addition amount of the binding agent is 1%-12% of the mass of the cladding material, composite green pellets are obtained upon completion of the cladding treatment; the composite green pellets are delivered into a dryer for drying and solidification and are finally formed to obtain the composite pellets.

In an embodiment of the present invention, in said step (2) and step (3), the binding agent is a mixed solution containing sodium humate, the sodium humate in the binding agent has a 4%-20% mass percentage concentration; preparation of the binding agent comprises the following steps: selecting coal material including humic acid (generally with a granularity −20 mm) and caustic soda as raw materials, mixing the caustic soda and water to produce NaOH solution by proportion (a mass percentage concentration of the obtained NaOH solution is controlled in a range of 1%-10%), ball grinding and mixing the coal material with the NaOH solution in a 1:3-10 solid-liquid ratio; agitating and heating the mixed material to 40-95° C. for perform syntheses reaction for not less than 30 min (preferably 30 min-180 min); filtering the reaction products to obtain filtrate as the binding agent. The coal material preferably refers to decomposed coal, peat and/or lignite containing humic acid above 20%.

In an embodiment of the present invention, the intensive mixer in said step (2) and step (3) includes an obliquely rotatable mixing barrel, a rotatable agitator is mounted in the mixing barrel; upon mixing, a rotation direction of the mixing barrel is contrary to a rotation direction of the agitator to allow the mixed materials in the mixing barrel to form a turbulence therein, thereby achieving an effect of agitating sufficiently and uniformly. The pelleting machine is a disc type pelleting machine; inner balls not meeting the process granularity requirement screened out in said step (3) all are fed into a roller mill or damp mill for milling, the inner ball material is selectively added according to a requirement for material humidity during milling, and then returns into the intensive mixer or damp mill to form closed-loop circulation.

In an embodiment of the present invention, the dryer used in said step (3) is a scale plate dryer, and the scale plate dryer is divided into a total of three drying stages in a delivery direction of the composite green pellets, including a low-temperature drying stage, an intermediate-temperature drying stage and a high-temperature drying stage;

Low-temperature hot air a range of 100-200° C. introduced into the low-temperature drying stage performs up-down air pumping or down-up wind blowing so that the low-temperature hot air vertically passes through a material layer and performs through-drying for the composite green pellets; the low-temperature hot air originates from exhaust gas discharged at a high-temperature hot air outlet of the high-temperature drying stage;

Intermediate-temperature hot air a range of 150-250° C. introduced into the intermediate-temperature drying stage performs up-down air pumping or down-up wind blowing so that the intermediate-temperature hot air vertically passes through the material layer and performs through-drying for the composite green pellets;

High-temperature hot air a range of 200-350° C. introduced into the high-temperature drying stage performs up-down air pumping or down-up wind blowing so that the high-temperature hot air vertically passes through the material layer and performs through-drying for the composite green pellets.

In an embodiment of the present invention, in said step (4) the kiln reduction comprises: the composite pellets obtained in step (3) is enabled to enter a cavity of the rotary kiln through a feed pipe at the kiln tail of the rotary kiln, a fuel burner is ignited to heat a reduction zone in the rotary kiln to 1300-1450° C., the composite pellets in the rotary kiln is reduced by the reductant at a high temperature to generate kiln fume, the outlet flue is arranged in a way that the fume exiting the kiln at the tail of the rotary kiln does not deviate much in a movement direction upon entering the outlet flue, thereby preventing metaphosphoric acid in the fume exiting the kiln from generating centrifugal physical settlement at the tail of the rotary kiln so that the metaphosphoric acid in the kiln gas directly enters a subsequent hydration tower along with the fume exiting the kiln; the high-temperature slag balls exiting the rotary kiln are delivered to a cooling device for comprehensive utilization.

In an embodiment of the present invention, in said step (4) the rotary kiln comprises a kiln body, a kiln head box, a kiln tail box and a driving device for driving the kiln body to rotate, at the kiln head of the kiln body is provided a fuel burner, at the kiln tail box are provided a feed pipe and an outlet flue connected to an external hydration tower, an upper portion of the kiln body is not provided with a wind tube, the outlet flue is disposed in a scope of radius of the kiln body with an axis of the rotary kiln as a center, and a fume delivery direction in the outlet flue is substantially parallel to the axial direction of the rotary kiln or at an angle of less than 45° relative to the axial direction of the rotary kiln.

In an embodiment of the present invention, the kiln body preferably comprises an external cylinder casing and a kiln liner disposed inside the cylinder casing (the kiln liner mainly comprises a refractory brick or a refractory pouring material), the kiln body is divided into a reduction zone and a preheating zone in a lengthwise direction of the rotary kiln, the reduction zone is close to the kiln head box, the preheating zone is close to the kiln tail box, a length of the reduction zone is ⅓-⅗ of a length of the kiln body, and a length of the preheating zone is ⅖-⅔ of the length of the kiln body. The kiln liner mainly comprises a composite refractory brick or a composite refractory pouring material, the kiln liner located in the reduction zone comprises a clay material layer (with a small thermal conduction coefficient) adjacent to the cylinder casing and a high alumina material layer (which is highly refractory and has a relatively large thermal conduction coefficient) adjacent to an inner cavity of the rotary kiln; the kiln liner located in the preheating zone comprises a clay material layer (with a small thermal conduction coefficient) adjacent to the cylinder casing and a silicon carbide material layer (which reacts with metaphosphoric acid to a low extent and has a relatively large thermal conduction coefficient) adjacent to the inner cavity of the rotary kiln.

In an embodiment of the present invention, furthermore, in said step (4), a kiln cleaning machine is disposed externally the kiln tail box, and a scraper (which is heat resistant and made of stainless steel) is provided in the kiln-cleaning machine to progressively extend into the kiln tail box of the rotary kiln and keep scraping relative to an inner wall of the cavity. An axis of the rotary kiln forms an angle in a range of 1.7°-2.9° with a horizontal plane, a length-diameter ratio (referring to a ratio of a rotary kiln length to an inner diameter of a steel casing of the cylinder of the rotary kiln)

of the kiln body (3) is 10-25:1, a filling rate of the rotary kiln is 7%-25%, and a rotation speed of the rotary kiln is controlled in a range of 0.6 r/min-3 r/min.

In an embodiment of the present invention, in the rotary kiln, a plurality of thermocouples for monitoring an in-kiln temperature are mounted in a lengthwise direction of the kiln body of the rotary kiln, the thermocouples are coupled to a temperature control device and a temperature display device outside the rotary kiln via an electrically conductive ring or a wireless transmitting and receiving device; the kiln head of the rotary kiln is mounted with an industrial television for monitoring conditions in the rotary kiln.

In an embodiment of the present invention, in the rotary kiln, an air pump for extracting air sample is mounted in the kiln tail box or the outlet flue of the rotary kiln.

In an embodiment of the present invention, in said step (4), the method for comprehensive utilization preferably comprises the following steps:
(a) Delivering high-temperature slag ball (slag balls from which $P_2O_5$ is totally released and which temperature generally reaches 1000-1300° C.) exiting the rotary kiln in the kiln process for producing phosphoric acid to a feed area of a cooling device, the cooling device comprises a supporting device, a trolley and a housing, the trolley is located on the supporting device, the housing is erected above the trolley, a grid plate is disposed on the trolley, the feed area and a unload area of the cooling device are both communicated with the trolley, and the high-temperature slag balls are delivered onto the trolley of the cooling device; the cooling device is divided into at least two interconnected cooling stages, each cooling stage is provided with a cold air inlet and a hot air outlet corresponding thereto; a gas flow passage between the cold air inlet and the hot air outlet passes through the grid plate on the trolley; a movement trajectory of the trolley passes by the feed area, a plurality of cold air inlets and the unload area in turn;
(b) The trolley rotates to bring the high-temperature slag balls into the first cooling stage in which a blower below the trolley is used to introduce cold air in from the cold air inlet, the cold air passes through the trolley located in the first cooling stage and its grid plate and performs heat exchange with the hot slag balls on the trolley and meanwhile residual carbon not used in the reaction in the high-temperature slag balls burns away; after heat exchange in the first cooling stage, hot air discharged out of the first hot air outlet corresponding to the first cooling stage is delivered through a first hot air delivery pipe to a kiln head box of the rotary kiln and then into a cavity of the rotary kiln as a hot air source for burning a reduction reaction product in the rotary kiln (specifically as combustion-supporting air for burning phosphorus and CO);
(c) The trolley rotates to bring the high-temperature slag balls from the first cooling stage to the second cooling stage in which a blower below the trolley is used to introduce cold air in from the cold air inlet, the cold air passes through the trolley located in the second cooling stage and its grid plate and performs heat exchange with the hot slag balls on the trolley; after heat exchange of the second stage cooling stage, hot air discharged out of the second hot air outlet corresponding to the second cooling stage is delivered through a second hot air delivery pipe into a composite green pellet dryer in the kiln process for producing phosphoric acid, as a hot air source for drying the composite green pellets;
(d) The trolley, through rotation, further brings the high-temperature slag balls from the second cooling stage to the remaining cooling stages in which the blower below the trolley is used to introduce cold air in from the cold air inlet, the cold air passes through the trolley located in the remaining cooling stages and its grid plate and performs heat exchange with the hot slag balls on the trolley; after heat exchange in the remaining cooling stages, hot air discharged out of remaining hot air outlets, after being dedusted, may be directly discharged or delivered into the composite green pellets dryer in the kiln process for producing phosphoric acid, as a hot air source for drying the composite green pellet; the cooled slag balls are discharged from the unload area.

In an embodiment of the present invention, in the above procedure for comprehensive utilization of the high-temperature slag balls, a temperature of hot air discharged out of the first hot air outlet is controlled above 600° C., and a temperature of hot air discharged out of the second hot air outlet is controlled above 350° C. Generally, after going through the cooling of the last cooling stage, the temperature of the slag balls may be reduced to 100° C., and the temperature of hot air at the outlet of the last cooling stage is generally less than 150° C. Being discharged out of the unload area, the cooled slag balls are used as artificial ceramsites which are directly used as architecture material or used for planting and culturing flowers and green plants; or the cooled slag balls are ground so that above 80 percent of the ground material passes a 100 mesh, and then used as an active material for manufacturing concrete or a blending material for manufacturing cement.

In an embodiment of the present invention, in the above procedure for comprehensive utilization of the high-temperature slag balls, the cooling device is an annular cooler or a belt-type cooler, the cold air inlet is disposed below the trolley, and the hot air outlet is disposed above the trolley (certainly a manner of taking air from above and exhausting hot air from below may also be employed). The annular cooler is divided into at least two interconnected cooling stages in a circumferential direction (preferably 2-5 cooling stages having preferably equal lengths); respective cooling stages are separated by a partition plate. The belt-type cooler is divided into at least two (preferably 2-5) interconnected cooling stages in a lengthwise direction; respective cooling stages are separated by a partition plate. The first hot air outlet is disposed in the first cooling stage adjacent to the feed area, the second hot air outlet is disposed in the second cooling stage adjacent to the first cooling stage, and a corresponding hot air outlet is disposed in the remaining cooling stages adjacent to the second cooling stage.

In an embodiment of the present invention, in said step (5), the absorption of phosphorus by hydration comprises: the fume exiting the kiln containing $P_2O_5$ and fluorine is introduced into a hydration tower, an acid solution cyclical spraying system connected with the hydration tower is started previously, the acid solution cyclical spraying system delivers concentrated phosphoric acid solution constantly in a spraying device in the hydration tower, the concentrated phosphoric acid solution sprayed downwardly comes in sufficient reverse-flow contact with the fume exiting the kiln, entering the tower and containing $P_2O_5$ and fluorine for mass transfer and heat transfer, $P_2O_5$ in the fume is subjected to chemical reaction with water in the sprayed concentrated phosphoric acid solution to produce phosphoric acid which is absorbed into the spraying liquid, the remaining portion forms phosphoric acid mist remains in gas phase, and the remaining fume in the hydration tower is discharged through its fume outlet; the phosphoric acid solution sprayed and falling down in the hydration tower enters the acid solution cyclical spraying system, first flows in an acid cooler, the cyclical acid solution flowing out of the outlet of the acid cooler is delivered by the circulating pump back to the spraying device of the hydration tower for further cyclical spraying; the fume discharged out of the fume outlet passes through a phosphoric acid mist capturing tower and a mist removing and separating tower in turn so that phosphoric acid mist entrained in the fume exiting the hydration tower is further captured, dilute phosphoric acid solution after capture of phosphoric acid mist by the phosphoric acid mist capturing tower and the mist removing and separating tower keeps crossflow of acid solution with the concentrated phosphoric acid solution in the hydration tower via pipeline arrangement; during operation of absorption of phosphorus by hydration, the concentrated phosphoric acid solution in the acid solution cyclical spraying system increases constantly, a surplus portion is filtered to become crude phosphoric acid product, and the crude phosphoric acid product enters a subsequent phosphoric acid refining step; on the other hand, an online water replenishing device is provided to implement online water replenishment for the whole process procedure, and fluorine-containing fume discharged out of the mist removing and separating tower enters a subsequent fluorine recovery step.

In an embodiment of the present invention, the spraying device of the hydration tower in said step (5) comprises at least two spraying layers located at different heights of the cavity of the hydration tower, the at least two spraying layers comprise a dilute phosphoric acid spraying layer and a concentrated phosphoric acid spraying layer, and the concentrated phosphoric acid spraying layer is disposed above the dilute phosphoric acid spraying layer; a liquid intake pipe of the cyclical phosphoric acid spraying layer is communicated with the acid solution cyclical spraying system, a liquid intake pipe of the dilute phosphoric acid spraying layer is communicated with a circulating and delivering pipe of the dilute phosphoric acid solution in the phosphoric acid mist capturing tower so as to achieve crossflow of the dilute phosphoric acid solution in the phosphoric acid mist capturing tower to the hydration tower, the acid solution cyclical spraying system is additionally connected, via a pipe, to the phosphoric acid mist capturing tower to enable crossflow of the cyclical phosphoric acid solution in the hydration tower to the phosphoric acid mist capturing tower.

In an embodiment of the present invention, an acid cooler in said step (5) is structured in a way that a plurality of heat exchange plates made of modified graphite pipes or stainless steel pipe are arranged in an agitation tank, cyclical cooling water is introduced in the pipes, through agitation the phosphoric acid solution entering the acid cooler forms forced convection and heat exchange on the heat exchange plates; a temperature of the fume exiting the kiln in step (1), after passing through heat transfer with the cyclically-sprayed cyclical phosphoric acid solution and the cooling by the water-cooling system in the hydration tower, drops to 75-130° C.;

In an embodiment of the present invention, a mass percentage concentration of the cyclically-sprayed phosphoric acid solution in the hydration tower in said step (5) is in a range 60%-90%, a temperature of the concentrated phosphoric acid solution upon entering the hydration tower is controlled in a range of 50-80° C., and a spraying liquid-gas ratio in the hydration tower is controlled in a range of 1 $L/m^3$-20 $L/m^3$.

In an embodiment of the present invention, in the phosphoric acid refining step in said step (5) is provided a phosphoric acid refining tank for refining crude phosphoric acid product, active carbon, diatomite, desulfurizer, dearsenic catalyst are added in the phosphoric acid refining tank, an amount of use of active carbon and diatomite is controlled as 0.1%-2% of mass of the crude phosphoric acid product to be refined; the desulfurizer is soluble barium salt with an amount of use 1-2 times a theoretical quantity (according to a chemical reaction formula); the dearsenic catalyst is hydrogen sulfide or sodium sulfide, with an amount of use 1-1.2 times a theoretical quantity (according to a chemical reaction formula); agitation and reaction duration in the phosphoric acid refining tank is 0.5 h-2 h. A product after agitation and reaction is pumped to a filtering system for filtration, with a filtrate being finish phosphoric acid product.

In an embodiment of the present invention, the phosphoric acid mist capturing tower in said step (5) is a fluid-state reverse-flow washing tower which comprises a washing pipe and a separation tank, fume discharged out of the fume outlet of the hydration tower enters the washing pipe of the phosphoric acid mist capturing tower, the cyclical dilute phosphoric acid solution sprayed from down to up in the washing pipe reversely impinges and contacts with up-down fume flow to establishes a foam area, the fume passes through the foam area and contacts a large-area dilute phosphoric acid liquid surface which updates constantly, capture, polymerization and growth of particles and heat transfer occurs in the foam area; a temperature of the fume, through evaporation of moisture content in the cyclical dilute phosphoric acid solution in a heat insulation manner, further falls to 60-90° C.; gas and liquid in the washing pipe enters the separating tank in the lower portion for gas-liquid separation, the separating tank meanwhile serves as a cyclic acid tank (a cyclical tank of dilute phosphoric acid solution), a majority of the cyclical dilute phosphoric acid solution after falling into the bottom of the separating tank is delivered by a circulating pump back to the washing pipe, and a small portion crossflows into the hydration tower; a mass percentage concentration of the cyclically-sprayed dilute phosphoric acid solution in the phosphoric acid mist capturing tower is in a range 10%-50%, a temperature of the dilute phosphoric acid solution is controlled in a range of 40-70° C., and a spraying liquid-gas ratio in the phosphoric acid mist capturing tower is controlled in a range of 3 $L/m^3$-25 $L/m^3$. A majority of phosphoric acid mist entrained in the fume exiting the hydration tower is transferred to the cyclical dilute phosphoric acid solution.

In an embodiment of the present invention, the fume discharged out of the fume outlet in the phosphoric acid mist capturing tower in said step (5) enters a mist removing and separating tower for further gas-liquid separation, a lower portion of the mist removing and separating tower is designed a phosphoric acid liquid droplet capturing structure similar to a cyclone deduster, a centrifugal force is utilized to capture already grownup phosphoric acid droplets from the fume, a wire mesh demister is mounted at an upper portion of the mist removing and separating tower to further capture not-yet-grownup phosphoric acid mist droplets in the fume; the online water-replenishing device is disposed in the mist removing and separating tower and located at a location of a fume outlet above the wire mish demister, it, on the one hand, serves as a water-replenishing device of the whole process system, and on the other hand, serves as a washing device of the wire mesh demister, which allows the phosphoric acid mist in the fume to be further captured by cleaning.

In an embodiment of the present invention, the fluorine recovery step in said step (5) includes the following steps: (1) Primary fluorine absorption: the fume discharged out of the mist removing and separating tower and containing fluorine is delivered to a fluosilicic acid washing pipe of a primary fluorine absorbing tower, then the fume goes from up to down and comes into sufficient gas and liquid two-phase contact with cyclical fluosilicic acid solution sprayed in from down to up and performs mass transfer, heat transfer and chemical reaction to produce fluosilicic acid, and meanwhile caloric content in the fume is, through evaporation of moisture content in the cyclical fluosilicic acid solution in a heat insulation manner, partly transferred to water vapor;

(2) Primary gas-liquid separation: gas and liquid in the fluosilicic acid washing pipe is totally transferred to a fluosilicic acid separating tank for gas-liquid separation, gas after separation enters a secondary fluosilicic acid washing pipe of a secondary fluorine absorbing tower through a fume outlet of the primary fluorine absorbing tower, liquid after separation stays in the fluosilicic acid separating tank and is delivered through the cyclical delivering pipe having the circulating pump back to fluosilicic acid washing pipe to perform operation of the above primary fluorine absorption;

(3) Secondary fluorine absorption: the fume entering the secondary fluosilicic acid washing pipe goes from up to down and comes into sufficient gas and liquid two-phase contact with the cyclical fluosilicic acid solution sprayed in from down to up and performs mass transfer, heat transfer and chemical reaction to produce fluosilicic acid, meanwhile caloric content in the fume is, through heat transfer, partly transferred into the cyclical fluosilicic acid solution;

(4) Secondary gas-liquid separation: gas and liquid in the secondary fluosilicic acid washing pipe is totally transferred to the secondary fluosilicic acid separating tank for gas-liquid separation, the separated gas goes through the fume outlet of the secondary fluorine absorbing tower into a subsequent exhaust gas absorbing tower for treatment, the separated liquid stays in the secondary fluosilicic acid separating tank and is partly delivered via the circulating pump back to the secondary fluosilicic acid washing pipe to perform the operation in the secondary fluorine absorbing step, and partly delivered to the fluosilicic acid separating tank of the primary fluorine absorbing tower;

(5) The fluosilicic acid solution in the primary fluorine absorbing tower increases constantly, and surplus fluosilicic acid solution is filtered to remove silica gel and then serves as fluosilicic acid as a by-product.

The primary fluorine absorbing tower and the secondary fluorine absorbing tower both employ a liquid-state reverse-flow washing tower, the primary fluorine absorbing tower mainly comprises a fluosilicic acid washing pipe and a fluosilicic acid separating tank, an outlet of the fluosilicic acid washing pipe is communicated with a middle portion of the fluosilicic acid separating tank, a fume outlet is disposed on top of the fluosilicic acid separating tank, a fluosilicic acid solution outlet is disposed on the bottom, and the fluosilicic acid solution outlet is communicated with a nozzle in the fluosilicic acid washing pipe via the circulating and delivering pipe having a circulating pump.

The secondary fluorine absorbing tower mainly comprises a secondary fluosilicic acid washing pipe and a secondary fluosilicic acid separating tank, a fume outlet of the primary fluorine absorbing tower is connected to the secondary fluosilicic acid washing pipe via a pipe, an outlet of the secondary fluosilicic acid washing pipe is communicated with a middle portion of the secondary fluosilicic acid separating tank, a foam removing layer (the foam removing layer is regularly washed by spraying with the cyclical fluosilicic acid solution to keep the foam removing effect) and a fume outlet are disposed on the top of the secondary fluosilicic acid separating tank, a fluosilicic acid solution outlet is disposed on the bottom, and the fluosilicic acid solution outlet is communicated with a nozzle in the secondary fluosilicic acid washing pipe and the fluosilicic acid separating tank in the primary fluorine absorbing tower via the circulating and delivering pipe having a circulating pump.

A fluosilicic acid cooler is preferably provided on the circulating and delivering pipe of the secondary fluorine absorbing tower, and the cyclical fluosilicic acid solution entering the secondary fluosilicic acid washing pipe goes through the cooling treatment of the fluosilicic acid cooler.

In the above fluorine recovery step, preferably a mass percentage concentration of the cyclical fluosilicic acid solution used in the primary fluorine absorption is in a range 8%-25% (more preferably 10%-20%), a temperature of the cyclical fluosilicic acid solution is controlled in a range of 25-65° C. (more preferably 50-65° C.), and a spraying liquid-gas ratio is controlled in a range of 3 $L/m^3$-25 $L/m^3$; preferably a mass percentage concentration of the cyclical fluosilicic acid solution used in the secondary fluorine absorption is in a range 0.5%-5%, a temperature of the cyclical fluosilicic acid solution is controlled in a range of 25-60° C. (more preferably 45-65° C.), and a spraying liquid-gas ratio is controlled in a range of 3 $L/m^3$-25 $L/m^3$ (more preferably 3 $L/m^3$-6 $L/m^3$).

In the above fluorine recovery step, preferably, an exhaust gas absorbing tower is connected to a fume outlet of the secondary fluorine absorbing tower, the exhaust gas absorbing tower is a spraying empty tower, a fume outlet is disposed on top of the exhaust gas absorbing tower, a spraying layer is disposed at an upper portion in the tower, a bottom in the tower is provided with a base absorption liquid box whose outlet is communicated with the respective spraying layer of the exhaust gas absorbing tower via the circulating and delivering pipe having the circulating pump to control a pH value of the base absorption liquid 8.

The raw material pretreatment in the present invention employs an optimized and improved crushing device with a high crushing ratio, which can not only substantially reduce the crushing energy consumption but also decrease the investment for the crushing device and the process cost and improve the crushing efficiency; in addition, in the present invention, each main raw material is equipped with an independent crushing device and ore-grinding device, crushing individually and grinding to produce powder respectively may, to a large extent, ensure stability of ingredients of the raw materials and prevent larger fluctuation of the proportions of raw materials; a hot air furnace is equipped for the ore-grinding device to omit a step of drying various ores and raw materials, further simplifying the process procedure and meanwhile reducing the ore-grinding energy consumption by over 20%; homogenization of phosphate ore powder employs a gas-flow homogenization method, thereby further ensuring stability of chemical components of the phosphate ore and making industrialized stable production possible.

During formation of composite pellets, the binding agent formulated in the present invention is simple in component, extensive in respect of raw material sources and low in cost, and furthermore, the binding effect of the binding agent is good; consistency of the composite pellets can be ensured more easily, and fluctuation of ingredients in the composite pellets is very small (a range of fluctuation of the proportions of ingredients in the composite pellets can be precisely controlled less than 5%); an important improvement is also made to the dryer of the composite pellets: first, the dryer is divided into three drying stages so that the drying procedure of the composite green pellets is performed from a low drying stage to a higher drying stage. This makes use of residual heat resource on the one hand, and on the other hand, can effectively prevent damages to the pellets due to burst of wet composite green pellets since an air flow temperature in the first drying stage is lower, and ensure quality of the composite pellets entering the kiln subsequently; intermediate-temperature hot air free of moisture is introduced in the second drying stage to form a higher humidity difference, which enables acceleration of the drying of the pellets in the case of ensuring no burst of the pellets; moisture of the composite pellets finally entering the third drying stage already falls below 4%, whereupon high-temperature hot air at a higher temperature may be introduced and the drying and solidifying procedure of the pellets is accelerated with no burst of pellets being ensured; moisture of pellets exiting the dryer in the present invention may be controlled 1.0%, an anti-pressure strength of the pellets reaches 250 KN per pellet, and a falling strength reaches 20 times per meter. This sufficient ensures the pellets will not be damaged during rotation in the rotary kiln so as to guarantee normal performance of subsequent pellet reduction procedure.

The outlet of the fume exhaust pipe at the kiln tail of the rotary kiln in the present invention is disposed in the same direction as the axis of the rotary kiln (a proper deviation may be permitted to facilitate arrangement of a pipe to the hydration tower) so that the fume exiting the kiln at the tail of the rotary kiln does not deviate much in the movement direction upon entering the outlet flue, thereby preventing metaphosphate in the fume existing the kiln from generating centrifugal physical settlement at the tail of the rotary kiln. Since metaphosphoric acid settled in the rotary kiln decreases, a cycle of forming a ring at the kiln tail is prolonged and an operation efficiency of the rotary kiln is improved. In a preferred solution, the kiln liner of the pretreating zone at the kiln tail of the rotary kiln employs a bi-layered composite material structure: a portion close to the cylinder casing of the rotary kiln employs a clay material layer, and a side adjacent to interior of the rotary kiln employs a silicon carbide material layer. Since it is difficult that the metaphosphate reacts with silicon carbide material, metaphosphate deposited in the pretreating zone of the rotary kiln falls off on its own due to gravity. A scraper made of heat-resistant stainless steel is mounted at the kiln tail box of the rotary kiln; once the kiln tail ring is formed and causes pellets to return from the kiln tail, fuel supply for heating the rotary kiln is stopped and delivery of pellets into the rotary kiln is stopped, and meanwhile, the scraper may progressively extend into the rotary kiln to cut and scrape away the kiln tail ringing by virtue of rotation of the rotary kiln itself.

In the process for comprehensive utilization of the high-temperature slag balls in the present invention, the comprehensive utilization process according to the present invention make full use of residual heat of the high-temperature slag balls, and use the residual heat to replenish heat for reduction reaction in the kiln process for producing phosphoric acid to substantially reduce energy consumption of the rotary kiln, and use the residual heat as a heat source for drying the composite green pellets, whereby thermal energy resource of hot air at different temperatures in different cooling stages are sufficiently used so as to allow for more sufficient utilization of energy in the whole kiln process for producing the phosphoric acid; the cooled slag balls are also used efficiently with a high added value, instead of being directly discharged outside. This not only reduces the solid waste's pollution and destruction to the environment, but also efficiently uses waste resource.

In the final step of absorbing fluorine by hydration and recovering fluorine in the present invention, the present invention makes a lot of improvements and optimization to phosphoric acid preparing apparatus and process in the prior art so that the whole apparatus is mad simpler in structure, more reasonable in process flow and highly applicable; the present invention make a lot of improvements and optimization to the apparatus and process for recovering fluorine in the prior art so that the whole fluorine recovering apparatus is mad simpler in structure, more reasonable in process flow and better meets the needs of process of absorbing phosphoric acid by hydration; in preferred solution, concurrent recovery of $P_2O_5$ and fluorine in the fume existing the kiln in the kiln phosphoric acid process may be achieved, effective cooperation of steps before and after absorption of phosphorus by hydration and recovery of fluorine is achieved, thereby obtaining a main produce phosphoric acid and a by-product fluosilicic acid with a higher value so that raw material resource is utilized more sufficiently, and economic benefits of the kiln phosphoric acid process are improved; preferred technical solution almost implement zero emission of exhaust gas, waste material and waste liquid in the process procedure and substantially improve environment protection of the whole process.

The process method in the present invention is not only reasonable and optimized in the process flow, but also requires a small apparatus investment and exhibits a high economic added value, but also solves many technical difficulties existing in the conventional kiln phosphoric acid process, and the whole process procedure is energy-saving, environment-friendly, operates efficiently, produces high-quality products, is completely adapted to directly produce phosphoric acid with low-class phosphate ore, is completely suitable for characteristics and treatment of fume containing $P_2O_5$ and fluorine (particularly kiln gas in the kiln phosphoric acid process), and is of important significance for effective utilization of a lot of low-class phosphate ore in China.

EXAMPLES

As shown in FIG. 1, an improved method for mass producing phosphoric acid with a rotary kiln comprises the following steps:

1. Raw Material Pretreatment

Figure 2:
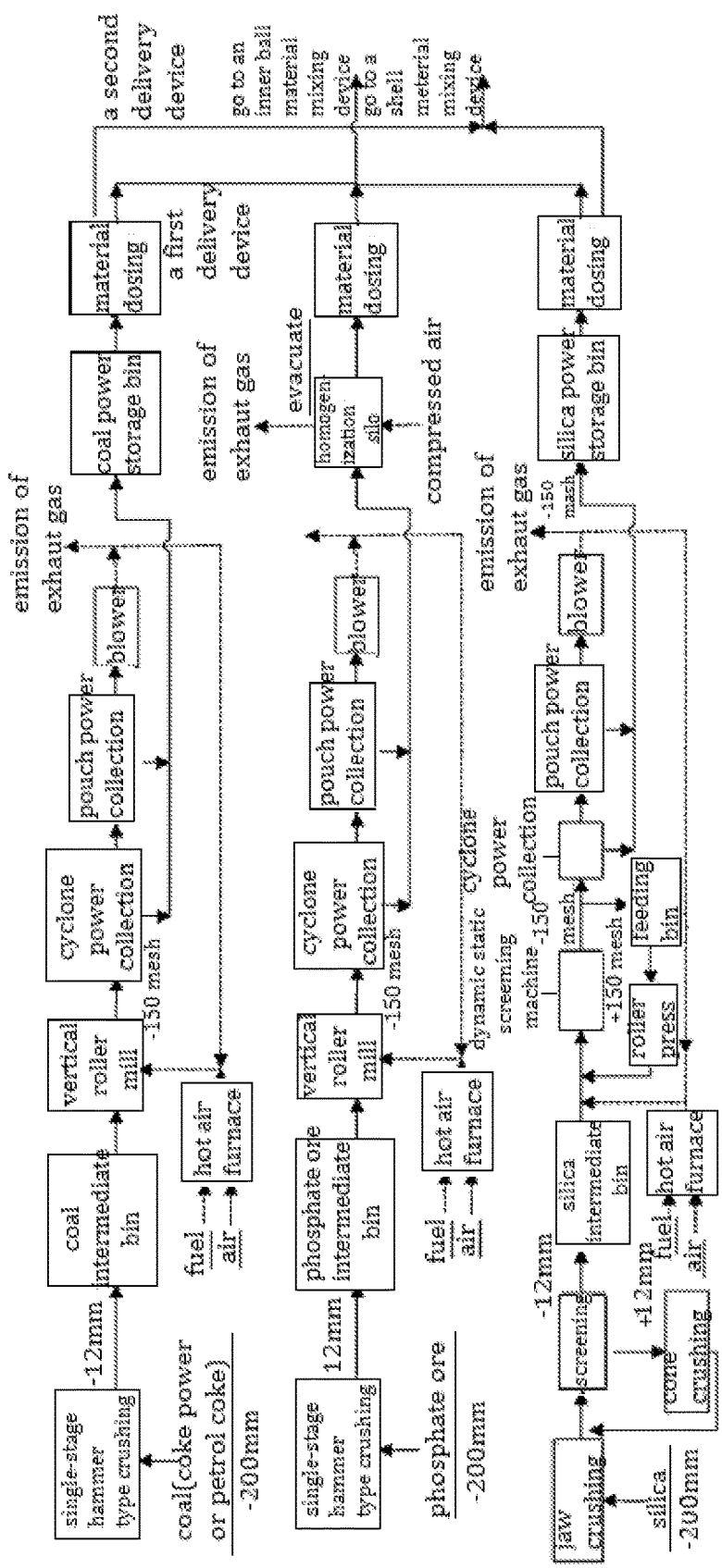
FIG. 2 is a schematic diagram of a process flow of a raw material pretreating step in a specific embodiment of the present invention.

As shown in FIG. 2, a raw material pretreatment method according to the present embodiment is used in a raw material pretreatment process system according to the present embodiment, the pretreatment process system comprises a carbonaceous reductant pretreatment system, a phosphate ore pretreatment system and a silica pretreatment system which are independent from one another, outlets of the carbonaceous reductant pretreatment system, the phosphate ore pretreatment system and the silica pretreatment system are all connected to an inner ball material mixing device via a first delivery device, and outlets of the carbonaceous reductant pretreatment system and the silica pretreatment system are both additionally connected to a shell material mixing device via a second delivery device. The present embodiment employs coal material (coke powder or petrol coke) as the carbonaceous reductant. The carbonaceous reductant pretreatment system according to the present embodiment mainly comprises a single-stage crushing device, a coal material intermediate bin, an ore grinding device, a coal powder storage bin and a formulating device which are connected in turn; the phosphate ore pretreatment system in the present embodiment mainly comprises a single-stage crushing device, a phosphate ore intermediate bin, an ore grinding device, a homogenization silo and a formulating device which are connected in turn; the silica pretreatment system in the present embodiment mainly comprises a dual-stage one-closed-loop crushing device, a silica intermediate bin, an ore grinding device, a silica powder storage bin and a formulating device which are connected in turn. The single-stage crushing device used in the carbonaceous reductant pretreatment system and the phosphate ore pretreatment system is a hammer-type crusher. The dual-stage one-closed-loop crushing device employed in the silica pretreatment system mainly comprises a jaw crusher, a screening machine and a cone crusher which are connected in turn. A discharge port of the cone crusher is cyclically connected to a feed port of the screening machine. The ore grinding device in both of the carbonaceous reductant pretreatment system and the phosphate ore pretreatment system employs a vertical grinder, the ore grinding device in the silica pretreatment system employs a ball grinder and/or a roller press, and the respective ore grinding devices are respectively connected to the coal powder storage bin, the homogenization silo and the silica powder storage bin via respective a powder material collecting and delivering device. Each ore grinding device is equipped with a hot air furnace for replenishing hot air during grinding. Each powder material collecting and delivering device comprises a cyclone powder-collecting device, a pouch powder-collecting device and a blower which are connected in turn, and an air outlet of each blower is connected to the hot air furnace corresponding to the respective pretreatment systems or directly discharged outside. The raw material pretreatment method according to the present embodiment mainly comprises pretreating the raw materials coal, phosphate ore and silica respectively with the aforesaid carbonaceous reductant pretreatment system, phosphate ore pretreatment system and silica pretreatment system, delivering the pretreated coal powder, phosphate ore powder and silica powder into the inner ball material mixing device for mixing and pelleting, and additionally delivering the pretreated coal powder and silica powder into the shell material mixing device for mixing; the raw material pretreatment method specifically comprises the following steps;

1.1 Coal material treatment: −200 mm coal material (coke powder or petrol coke) is crushed to less than 12 mm in granularity by single-stage hammer-type crushing (or impact crushing or hammer type-impact type combined crushing), and then the crushed material is delivered to the coal material intermediate bin which delivers the crushed material to a vertical roller mill (namely, a vertical grinder, or an air-swept coal mill may be used) via a weighing and feeding device for grinding, and the weighing and feeding device may stabilize a load of the grinder; after the vertical grinder grinds feed powder to −100 mesh to −325 mesh, the powder material is collected by a combined dust collector comprised of a cyclone powder-collecting device and a pouch powder-collecting device (or collected individually by a high-concentration pouch dust collector) and delivered to the coal powder storage bin; hot air is replenished constantly via the configured hot air furnace during grinding so as to remove moisture content entrained in the powder material according to the moisture content of the raw material; the whole coal material pretreatment procedure has a higher crushing ratio, and can save the crushing energy consumption and lower investment and the process cost.

1.2 Phosphate ore pretreatment: −200 mm phosphate ore is crushed to less than 12 mm in granularity by single-stage hammer-type crushing (or impact crushing or hammer type-impact type combined crushing), and then the crushed material is delivered to the phosphate ore intermediate bin which delivers the crushed material to a vertical grinder (an air-swept coal mill) via a weighing and feeding device for grinding, and the weighing and feeding device may stabilize a load of the grinder; after the vertical grinder grinds feed powder to −100 mesh to −200 mesh, the powder material is collected by a combined dust collector comprised of a cyclone powder-collecting device and a pouch powder-collecting device (or collected individually by a high-concentration pouch dust collector) and delivered to the homogenization silo; hot air is replenished constantly via the configured hot air furnace during grinding so as to remove moisture content entrained in the powder material according to the moisture content of the raw material; the whole phosphate ore pretreatment procedure has a higher crushing ratio, and can save the crushing energy consumption and lower investment.

1.3 Silica pretreatment: −200 mm silica is crushed to less than 12 mm in granularity by a dual-stage one-closed-loop crushing device (or single-stage impact type crushing or hammer type-impact type combined crushing), and then the crushed material is delivered to the silica intermediate bin which delivers the crushed material to a high-pressure roller press (or a high-pressure roller press-ball grinding combined manner) via a weighing and feeding device for grinding, and the weighing and feeding device may stabilize a load of the grinder; after the ore grinding device grinds feed powder to −100 mesh to −200 mesh, the powder material is collected by a combined dust collector comprised of a cyclone powder-collecting device and a pouch powder-collecting device and delivered to the silica powder storage bin; hot air is replenished constantly via the configured hot air furnace during grinding so as to remove moisture content entrained in the powder material according to the moisture content of the raw material.

1.4 The coal powder delivered by a delivery device into the coal powder storage bin meanwhile serves as a raw material for the inner ball material and the shell material in the subsequent kiln phosphoric acid process; the silica powder delivered by a delivery device into the silica powder storage bin meanwhile serves as a raw material for the inner ball material and the shell material in the subsequent kiln phosphoric acid process; the phosphate ore powder delivered by a delivery device into the homogenization silo is stirred and homogenized by using compressed air. A gap type homogenization silo may be used, or a continuous homogenization silo may be used, with a homogenization value greater than 4; the homogenization silo itself is used as the storage bin of phosphate ore powder.

2. Preparation of Inner Balls

The carbonaceous reductant powder (the present embodiment selects coal powder above −200 mesh, e.g., coke powder, smokeless coal powder or petrol coke), phosphate ore powder (above −150 mesh) and silica powder (above −150 mesh) obtained after treatment in the above step 1 are added to an intensive mixer according to a proportional requirement in composite pellets, and ingredients may be weighed by an electronic scale, and meanwhile a binding agent according to the present embodiment is added in the above-mentioned amount.

A method of preparing the binding agent used in the present embodiment specifically comprises the following steps: selecting decomposed coal (or peat or lignite) containing humic acid or caustic soda as a raw material, content of the humic acid contained in the decomposed coal in the present embodiment being above 40%; mixing caustic soda (93% sodium hydroxide) with water to obtain sodium hydroxide solution with 2% mass percentage concentration; ball-grinding and mixing the above decomposed coal and sodium hydroxide solution with a 1:5 solid-to-liquid ratio for 20 min; feeding the mixed material into a reaction tank with an agitator, starting the agitator, heating to 90° C. to perform synthesis reaction for 30 min; filtering the reaction products to obtain filtrate as the binding agent. The binding agent in the present embodiment is a mixed solution containing sodium humate, the sodium humate in the binding agent being 8% mass percentage concentration.

Figure 3:
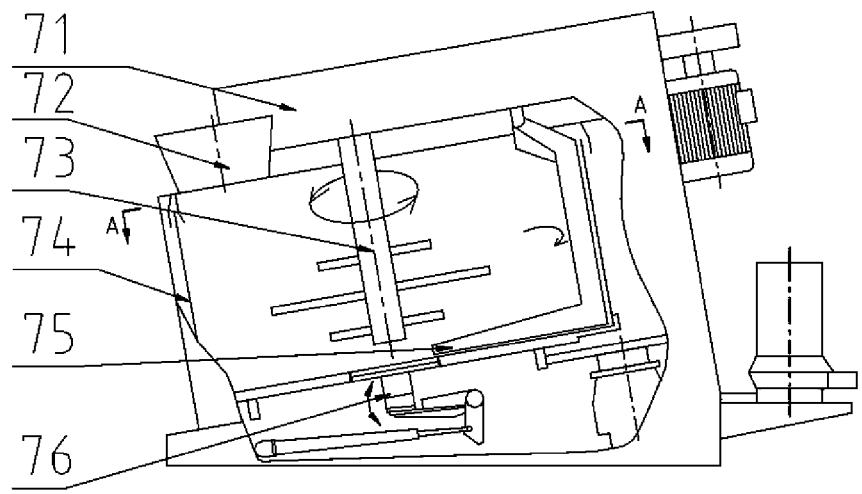
FIG. 3 is a structural schematic view of an intensive mixer used in a specific embodiment of the present invention.
Figure 4:
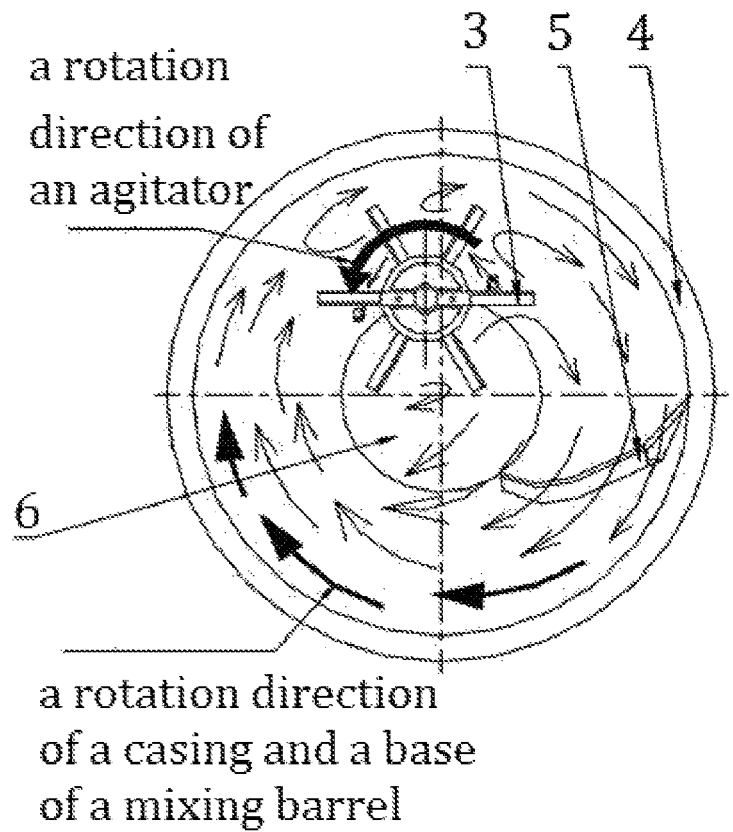
FIG. 4 is a view integrating a sectional view taken along A-A in FIG. 3 and a working principle view.

As shown in FIG. 3, the intensive mixer used in the present embodiment comprises an obliquely rotatable mixing barrel, the mixing barrel comprises a casing 74 and a rotatable agitator 73 mounted in the barrel, a feed hopper 72 and a driving member 71 are disposed above the mixing barrel, a material turning plough 75 is disposed on one side of the barrel, a discharge port 76 is disposed on a bottom of the barrel; a working principle of the intensive mixer is as follows: upon mixing, a rotation direction of the mixing barrel is contrary to a rotation direction of the agitator (see FIG. 4); after the above raw materials are fed in the oblique rotatable mixing barrel, they rotate relative to the agitator which rotates inversely so that disperse mixed materials therein form a circulating material flow and thereby function to mix intensively; inverse rotation of the agitator and the mixing barrel may enable mixed materials to form a turbulence therein, thereby achieving an effect of agitating sufficiently and uniformly; materials are fed continuously into and discharged continuously out of the intensive mixer to ensure continuity of the production procedure.

The mixed material which is mixed sufficiently and uniformly is fed into the material bin whose lower portion is mounted with a weighing and feeding device which weighs with an electronic scale, such weighing and feeding device may be a feeding device combining a disc feeding machine with an electronic scale, a weight weighed by the electronic scale is compared with a predetermined feed quantity; when a deviation occurs, a computer control system automatically adjusts a rotation speed of the disc of the disc feeding machine to make the quantity of the fed material equal to the predetermined feed quantity (other weighing and feeding devices having an electronic scale may be used directly).

In the inner ball material of the present embodiment, $CaO/SiO_2$ mole ratio is 0.3 (less than 0.6 or greater than 6.5, and the amount of carbonaceous reductant powder is above 1.5 times a theoretical amount of $P_2O_5$ in phosphate ore powder; a mass ratio of carbonaceous reductant powder to silica powder in a cladding material is 2.5:1 (in a range of 1.5-5:1). The mixed material which is mixed sufficiently and uniformly is fed by the weighing and feeding device into a disc pelleting machine for pelleting treatment, the abovementioned binding agent in the embodiment is additionally added in an application form of droplets and/or mist, the addition amount of the binding agent is 4%-6% of mass of the mixed material, and inner balls are obtained upon completion of the pelleting.

3. The Forming of Composite Pellets 3.1 Preparation of cladding material: the aforesaid carbonaceous reductant powder and silica power are added to another intensive mixer according to proportional requirements, meanwhile the binding agent of the present embodiment is added according to the addition quantity of the composite pellets of the present embodiment, they are mixed sufficiently to obtain a cladding material; the intensive mixer in this step is identical with the intensive mixer used in step 2 in respect of the working principle and functional structure. The intensive mixer may also be replaced with a roller mill or damp mill which continuously feeds material and continuously discharges material.

3.2 The forming of composite green pellets: inner balls getting out of a ball disc in step 2 are subjected to bi-layered roller-type screening treatment by using a bi-layer roller-type screening machine to obtain inner balls with a granularity meeting the process requirement, said inner balls are fed into another disc pelleting machine for cladding treatment, meanwhile the cladding material obtained in step 3.1 is introduced in said disc pelleting machine, the above binding agent is additionally added in an application form of droplets and/or mist during the cladding treatment, the addition amount of the binding agent is 4%-6% of the mass of the cladding material, an isolation layer separating a reduction zone from an oxidization zone is formed externally the inner balls upon completion of the cladding treatment to obtain the composite green pellets. After the by-layered roller-type screening treatment, unqualified inner balls greater than or smaller than a predetermined particle diameter are screen away and fed into the roller mill (or damp mill) for milling, during milling the inner ball material in the previous ingredient-formulating step is selectively added according to the roller mill's requirement for material humidity, and then returns into the intensive mixer in the above step 2 to form closed-loop circulation to sufficiently use the process raw material and reduce discharge and waste of the waste material during the process. The composite green pellets fabricated in the present embodiment has an anti-pressure strength 10N per ball, and a falling strength of about 10 times per 0.5 meter, and furthermore, a fluctuation range of $CaO/SiO_2$ mole ratio in the composite green pellets in the present embodiment can be controlled less than 5%.

Figure 5:
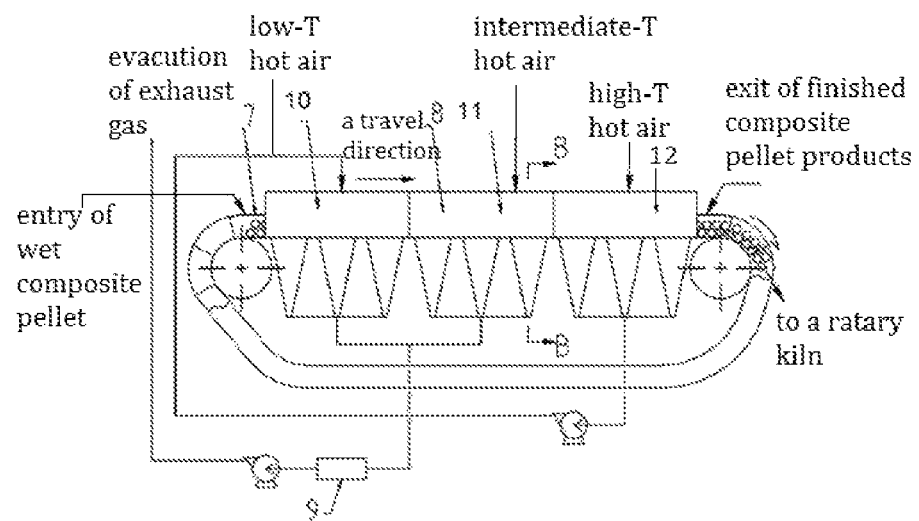
FIG. 5 is a structural schematic diagram of a scale plate dryer used in a specific embodiment of the present invention.
Figure 6:
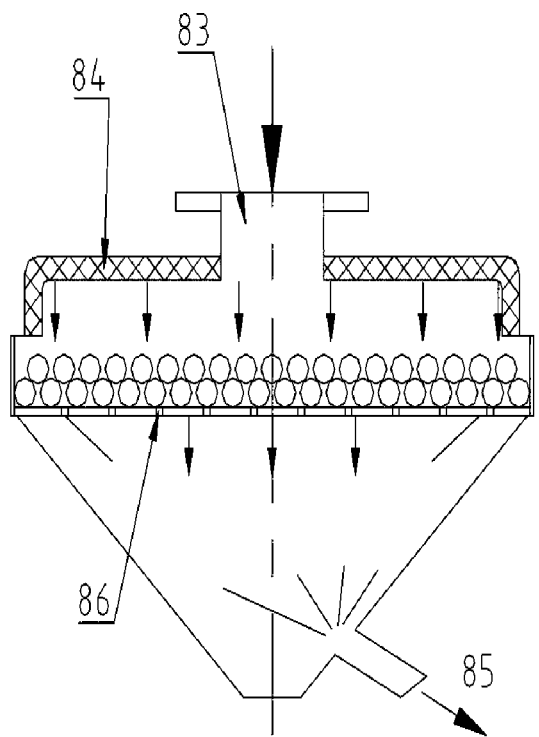
FIG. 6 is a view integrating a sectional view taken along B-B in FIG. 5 and a working principle view.
Figure 7:
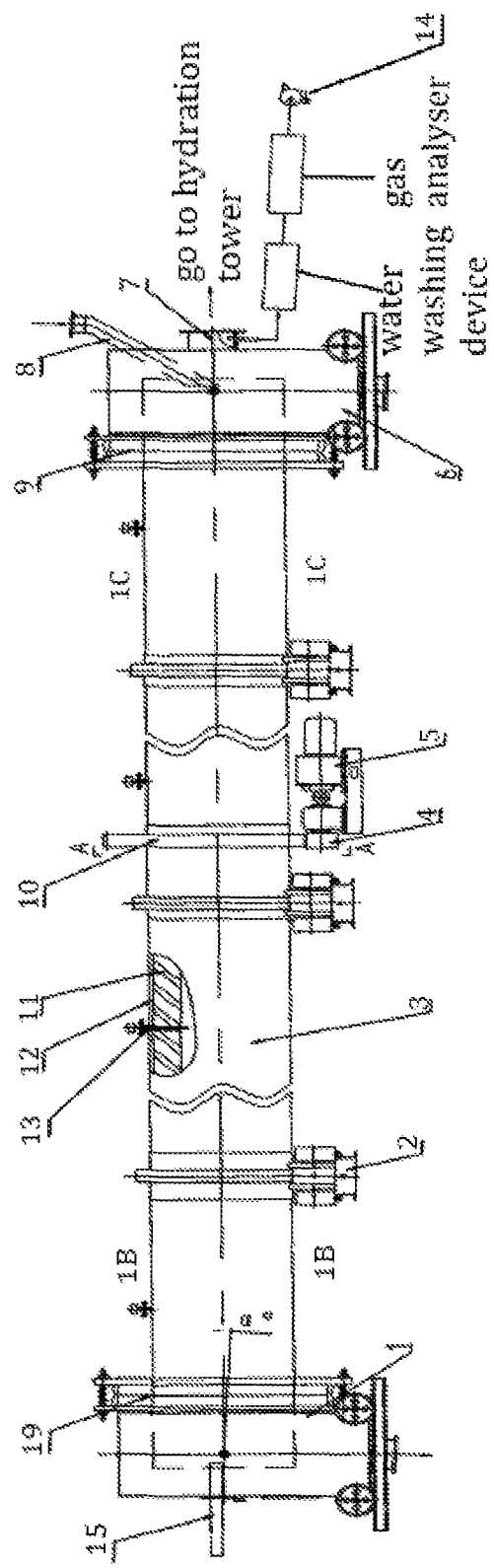
FIG. 7 is a structural schematic view of a rotary kiln according to a specific embodiment of the present invention.
Figure 8:
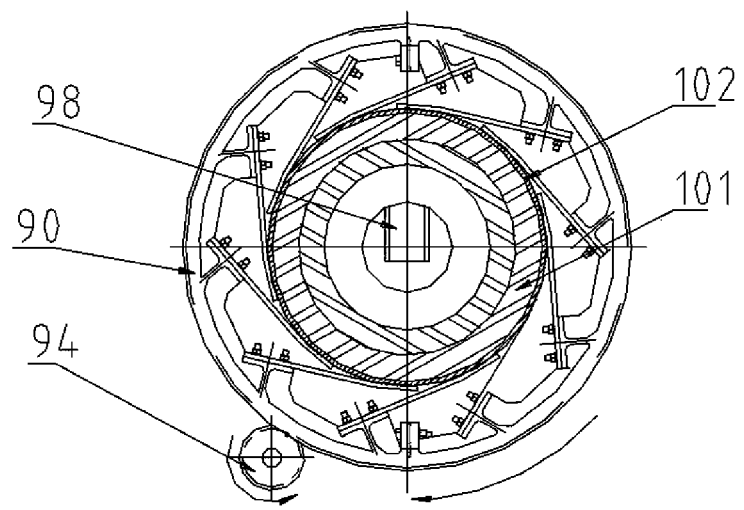
FIG. 8 is a sectional view taken along A-A in FIG. 7.

3.3 Drying and solidification: the composite green pellets obtained after step 3.2 are delivered into a scale plate dryer for drying and solidification. As shown in FIG. 5 and FIG. 6, the scale plate dryer in the present embodiment comprises a drying furnace body 78, the drying furnace body 78 comprises a low-temperature drying stage 80, an intermediate-temperature drying stage 81 and a high-temperature drying stage 82, a hot air inlet 83 is disposed on top of the drying furnace body 78, an air outlet 85 is disposed on a bottom, a temperature preserving layer 84 is cladded peripherally, material loading carts 77 are disposed in a chamber of the drying furnace body 78, several material loading carts 77 are connected consecutively to form a ring, an air vent 86 is provided on the material loading cart 77, chain transmission is employed, the material loading carts 77 are dragged via a chain with seats to rotate cyclically to achieve a purpose of continuous drying and delivery. The bottom of the drying furnace body 78 is provided with a deduster 79 to collect and process fume and dust generated during the drying. During delivery of the composite green pellet materials, dry hot air is introduced from up to down in a direction perpendicular to the movement of the material to achieve the purpose of drying.

A specific working principle of the scale plate dryer in the present embodiment is that a total of three drying stages, namely, low-temperature, intermediate-temperature and high-temperature drying stages are divided along a movement and delivery direction of the composite green pellets material loading carts 77. The composite green pellets first enter the low-temperature drying stage 80, low-temperature hot air of 130-200° C. is introduced in the low-temperature drying stage 80 through up-down air pumping or down-up air blowing so that the low-temperature hot air vertically passes through the composite green pellet layer and performs through-drying for the composite green pellets; the low-temperature hot air originates from exhaust gas discharged at the high-temperature hot air outlet of the high-temperature drying stage, and is introduced to the low-temperature drying stage 80 via a blower; the low-temperature drying stage 80, on the one hand, uses residual heat of low-temperature hot air discharged out of the high-temperature drying stage 82, and on the other hand, can effectively prevent damages to the pellets caused by burst of wet composite green pellets and ensure the quality of composite green pellets entering the kiln subsequently due to a lower gas flow temperature of the low-temperature drying stage 80. The composite green pellets after being dried in the low-temperature drying stage 80 then enter the intermediate-temperature drying stage 81 for drying, intermediate-temperature hot air of 220-250° C. is introduced in the intermediate-temperature drying stage 81 through up-down air pumping or down-up air blowing so that the intermediate-temperature hot air vertically passes through the material layer and performs through-drying for the composite green pellets; intermediate-temperature hot air not carrying moisture is introduced into the intermediate-temperature drying stage to form a higher humidity difference, which quickens the drying of the pellets in the case of ensuring the pellets do not burst. The composite green pellets after being dried in the intermediate-temperature drying stage 81 then enter the high-temperature drying stage 82 for drying, moisture content in the composite pellets finally entering the high-temperature drying stage 82 already falls below 4%, high-temperature hot air of 250-350° C. is introduced in the high-temperature drying stage 82 through up-down air pumping or down-up air blowing so that the high-temperature hot air vertically passes through the material layer and performs final drying for the composite green pellets. The high-temperature hot air of the high-temperature drying stage 82 preferably originates from use of residual heat of the exhaust gas in subsequent discharge-cooling stage of the rotary kiln, or a hot air furnace may be additionally arranged to supply hot air. The exhaust gas discharged by the low-temperature drying stage 80 and intermediate-temperature drying stage 81 may be collected by a fan, is dedusted by a deduster 79 and exhausted into the atmosphere after reaching the environment protection requirement.

The composite pellets obtained after drying and solidification is a core-shell shaped structure with an inner wall encapsulated with a shell, the inner wall mainly comprises the inner wall material and the binding agent, and the shell mainly comprises the cladding material and the binding agent; the inner ball material consists of the carbonaceous reductant powder, and phosphate ore powder and silica powder, the addition quantity of the binding agent in the inner wall is 6% (or 1%-10%) of the mass of the inner ball material; the addition quantity of the binding agent in the shell is 6% (or 1%-10%) of the mass of the cladding material; the inner ball is combined with the shell through the binding agent to form the core-shell shaped structure. Moisture content in the composite pellets is controlled 1.0%, an average anti-pressure strength of the pellets reaches 250 KN per ball, and a falling strength reaches 20 times per meter, and it can be ensured that the composite pellets are not destroyed during subsequent rotation in the reducing rotary kiln so as to ensure smooth performance of the reduction procedure of the composite pellets.

Among the composite pellets getting out of the dryer in the present embodiment, the composite pellets damaged during drying (those pellets with a diameter less than 5 mm) are screened via a vibrating screen to reduce the amount of powder material subsequently entering the rotary kiln and thereby delay a ringing cycle of the material in the high-temperature stage in the rotary kiln. The composite pellets getting out of the vibrating screen are fed via an air lock valve through a discharge duct from the kiln tail box of the rotary kiln to the rotary kiln for subsequent high-temperature reducing treatment.

4. Kiln Reduction

Figure 9:
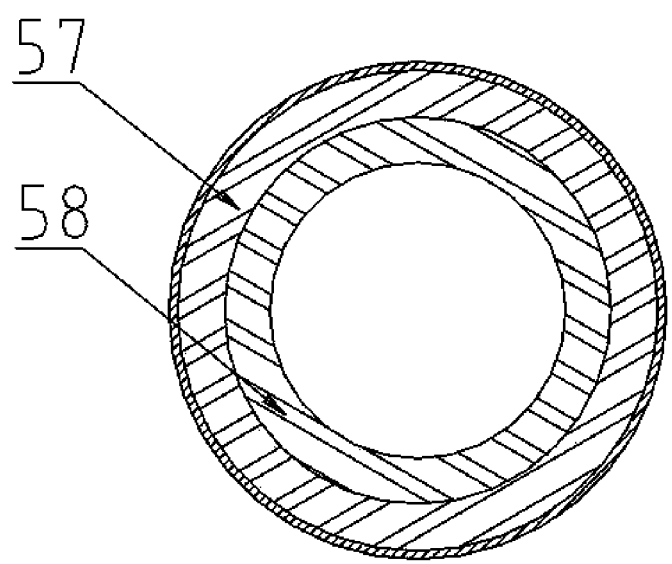
FIG. 9 is a sectional view taken along B-B in FIG. 7.
Figure 10:
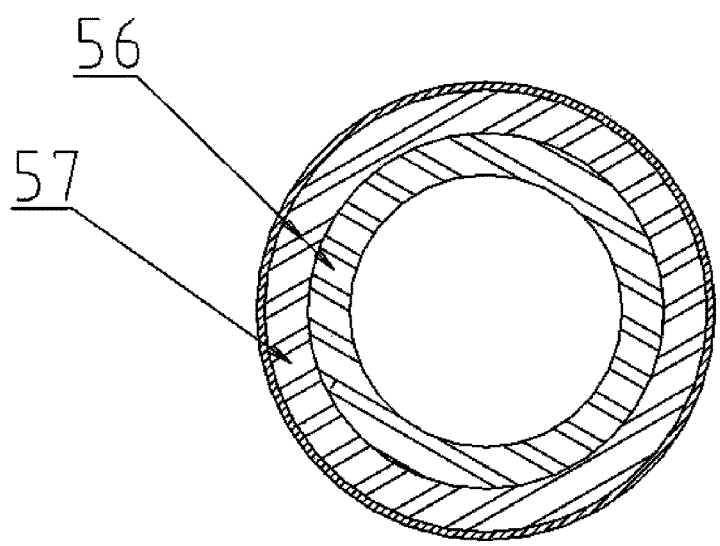
FIG. 10 is a sectional view taken along C-C in FIG. 7.
Figure 11:
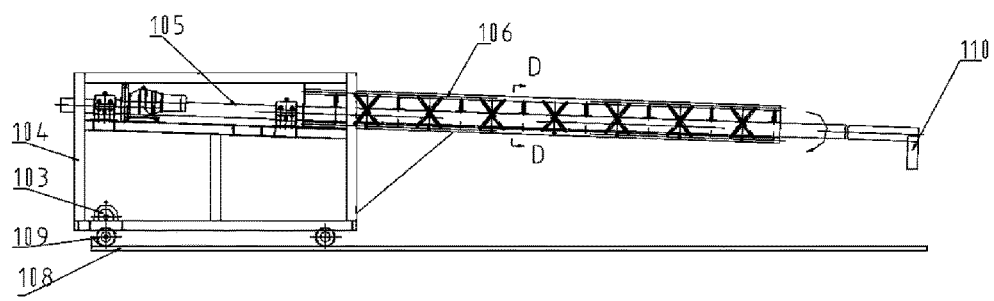
FIG. 11 is a structural schematic view of a kiln cleaning machine according to a specific embodiment of the present invention.
Figure 12:
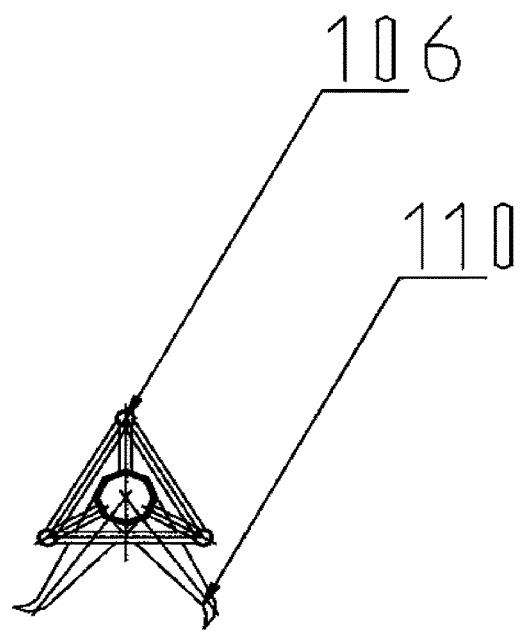
FIG. 12 is a sectional view taken along D-D of FIG. 11.

The rotary kiln in the process method according to the present embodiment, as shown in FIG. 7-FIG. 10, comprises a kiln body 93, a kiln head box 91, a kiln tail box 96 and a driving device 95 for driving the kiln body 93 to rotate, the driving device 95 comprises a motor, a transmission pinion 94 connected with the motor and a transmission gear 90 meshing with the transmission pinion 94, and a supporting wheel device 92 is additionally disposed to support the kiln body 93. A kiln head dynamic seal 100 is employed between the kiln head box 91 and the kiln body 93, and a kiln tail dynamic seal 99 is employed between the kiln tail box 96 and the kiln body 93. At the kiln head of the kiln body 93 are provided a fuel burner 55 and a high-temperature slag ball outlet, at the kiln tail box 96 of the kiln body 93 are provided a feed pipe 98 and an outlet flue 97 connected to an external hydration tower, and the feed pipe 98 is communicated with an inner cavity of the rotary kiln. An upper portion of the kiln body 93 is not provided with a wind tube, the outlet flue 97 is disposed on an axis of the rotary kiln, and a fume delivery direction in the outlet flue 97 is substantially parallel to an axial direction of the rotary kiln. The kiln body 93 comprises an external cylinder casing 102 and a kiln liner 101 disposed inside the cylinder casing 102, the kiln body 93 is divided into a reduction zone and a preheating zone in a lengthwise direction of the rotary kiln, the reduction zone is close to the kiln head box 91, the preheating zone is close to the kiln tail box 96, a length of the reduction zone is ⅓-⅗ (½ in this embodiment) of a length of the kiln body 93, and a length of the preheating zone is ⅖-⅔ (½ in this embodiment) of the length of the kiln body 93. The kiln liner 11 mainly comprises a composite refractory pouring material (or a composite refractory brick). As shown in FIG. 9, the kiln liner 101 located in the reduction zone comprises a clay material layer 57 adjacent to the cylinder casing 102 and a high alumina material layer 58 (alumina 65%) adjacent to the inner cavity of the rotary kiln; as shown in FIG. 10, the kiln liner 101 located in the preheating zone comprises the clay material layer 57 adjacent to the cylinder casing 102 and a silicon carbide material layer 56 adjacent to the inner cavity of the rotary kiln. A kiln cleaning machine is disposed externally the kiln tail box 96. As shown in FIG. 11-FIG. 12, the kiln cleaning machine is placed on a platform 108, wheels 109 rollable on the platform 108 are provided on a bottom of the kiln cleaning machine, the wheels 109 are driven by a travel decelerating motor 103, a main body of the kiln cleaning machine is a machine frame 104, a rotation shaft 105 driven by a motor is mounted in an upper portion of the machine frame 104, the rotation shaft 105 extends in a substantially horizontal direction out of the machine frame 104, a supporting truss 106 is sleeved around the extended portion, a free end of the extended portion of the rotation shaft 105 is provided with a scraper 110 (which is heat resistant and made of stainless steel) which may progressively extend into the kiln tail box 96 of the rotary kiln (the scraper is rotatable to facilitate advancement of the scraper) and keep scraping relative to an inner wall of the cavity. Once the kiln tail ring is formed and causes material balls to return from the kiln tail, fuel supply for heating the rotary kiln is stopped and delivery of material balls into the rotary kiln is stopped, and meanwhile, the scraper 110 may progressively extend into the rotary kiln to cut and scrape away the kiln tail ringing by virtue of rotation of the rotary kiln itself.

Figure 13:
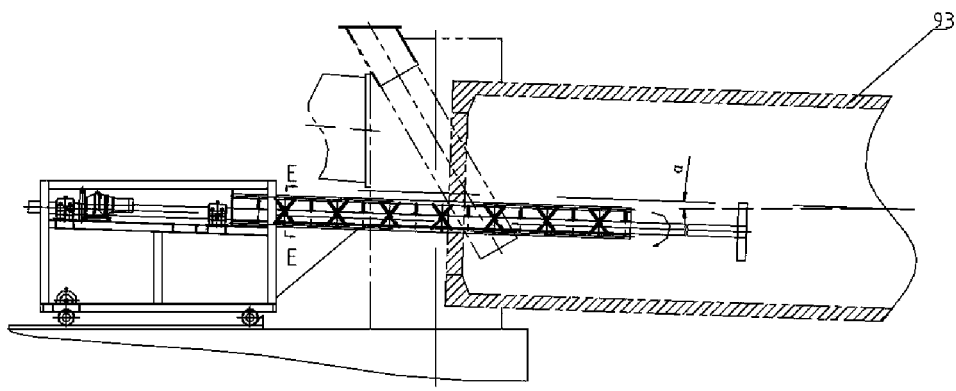
FIG. 13 is a theoretical view of the kiln cleaning machine according to the specific embodiment of the present invention upon operation.
Figure 14:
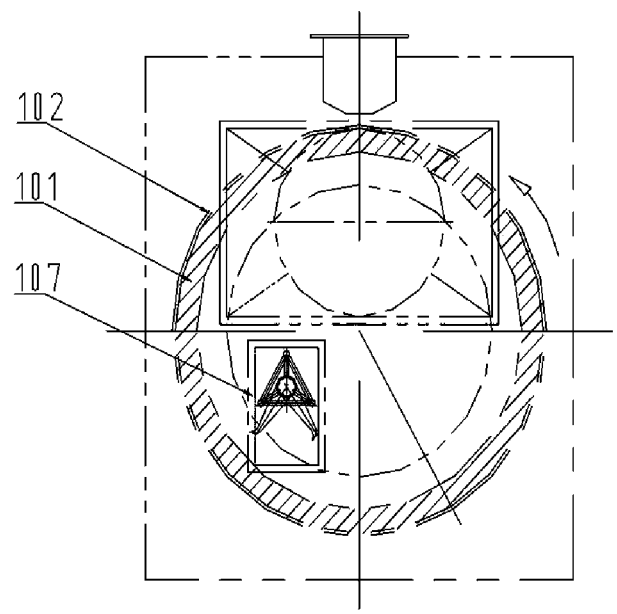
FIG. 14 is a sectional view taken along E-E in FIG. 13.

A specific operation of employing the above rotary kiln of the present embodiment to perform kiln reduction is as follows: the aforesaid rotary kiln is used to perform the kiln process for producing phosphoric acid, the composite pellet raw material after the above step 3 is enabled to enter the cavity of the rotary kiln through a feed pipe 98 at the kiln tail of the rotary kiln, the fuel burner 55 is ignited to heat the reduction zone in the rotary kiln to 1300-1450° C., the phosphate ore raw material in the rotary kiln is reduced by the reductant at a high temperature to generate kiln fume, an outlet of the outlet flue 97 at the kiln tail of the rotary kiln is disposed in the same direction as an axis of the rotary kiln (namely, disposed parallel to the axis of the rotary kiln) so that the fume exiting the kiln at the tail of the rotary kiln does not deviate much in the movement direction upon entering the outlet flue 97, thereby preventing metaphosphoric acid in the fume exiting the kiln from generating centrifugal physical settlement at the tail of the rotary kiln so that the metaphosphoric acid in the kiln gas directly enters a subsequent hydration tower along with the fume exiting the kiln and becomes orthophosphoric acid after meeting water. Furthermore, in the present embodiment, the kiln liner 101 located at the preheating zone of the rotary kiln is produced into a bi-layered composite refractory pouring material (or composite refractory brick), a portion of the kiln liner adjacent to the cylinder casing 102 of the rotary kiln employs a clay material to produce the clay material layer 57, and a portion of the kiln liner adjacent to the inner cavity of the rotary kiln employs a silicon carbide material to produce the silicon carbide material layer 56. Since it is difficult that the metaphosphate reacts with the silicon carbide material, this allows the metaphosphate deposited on the preheating zone kiln liner 101 of the rotary kiln due to reaction to less adhere to the kiln liner 101. Such kiln liner structure may further stop the metaphosphate from reacting and forming ring with the kiln liner 101, make it fall off on its own, and further ease occurrence of ring forming at the kiln tail. Furthermore, the scraper 110 made of heat-resistant stainless steel is mounted in a kiln cleaning machine disposed external of the kiln tail box 96 of the rotary kiln of the present embodiment, and the scraper 110 is a scraper that may progressively extend into the kiln tail box 96 of the rotary kiln and keep scraping relative to the inner wall of the cavity; when the ring-forming at the tail of the rotary kiln causes material balls of the raw materials to return materials to outside the rotary kiln from the kiln tail, fuel supply for heating the rotary kiln is stopped first, meanwhile delivery of the material balls into the rotary kiln is stopped, the material balls in the rotary kiln are emptied, then the scraper 110 in the kiln cleaning machine is made extend gradually from a rotary kiln door frame 107 into the rotary kiln, and then the ring formed at the kiln tail are cut and scraped away by virtue of rotation of the rotary kiln itself (see FIG. 13 and FIG. 14 for the working principle of the kiln cleaning machine). As can be seen from the above, the rotary kiln according to the present embodiment, through multiple guarantee measures and technical means, effectively eases the issue about ring-forming at the tail of the rotary kiln in the kiln process for producing phosphoric acid.

In addition, a plurality of thermocouples 113 for monitoring the in-kiln temperature are mounted in the lengthwise direction of the kiln body 93 of the rotary kiln according to the present embodiment, and the thermocouples 113 are coupled to a temperature control device and a temperature display device outside the rotary kiln via an electrically conductive ring or a wireless transmitting and receiving device. With the thermocouples 113 being disposed, it can be ensured that a temperature requirement be set for reaction wherein a maximum temperature of the composite pellets whose inner pellet material $CaO/SiO_2$ mole ratio is less than 0.6 does not exceed 1370° C., and a temperature requirement be set for reaction wherein a maximum temperature of the composite pellets whose inner pellet material $CaO/SiO_2$ mole ratio is greater than 6.5 does not exceed 1450° C. The kiln head of the rotary kiln is mounted with an industrial television for monitoring conditions in the rotary kiln. Additionally, an air pump 114 for extracting air sample is mounted on the outlet flue 97 at the outlet of the kiln tail box 96 of the rotary kiln according to the present embodiment. The air sample collected by the air pump 14, after being washed with water and dedusted, is fed into a CO and $O_2$ gas analyzing instrument to monitor CO and $O_2$ content of the outlet fume of the rotary kiln so as to better control a range of content of CO and $O_2$ of the fume existing the kiln (generally 0-5%).

In the present embodiment, an axis of the rotary kiln forms an angle α in a range of 1.2°-2.9° with a horizontal plane (2.3° in the present embodiment), a length-diameter ratio of the kiln body 3 is 10-25:1 (15:1 in the present embodiment), a filling rate of the rotary kiln is 7%-25% (13% in the present embodiment), and a rotation speed of the rotary kiln is controlled in a range of 0.6 r/min-3 r/min (1 r/min in the present embodiment). A thickness of the refractory material of the rotary kiln is preferably 200 mm-280 mm (220 mm in the present embodiment).

5. Comprehensive Utilization of the High-Temperature Slag Balls

Figure 15:
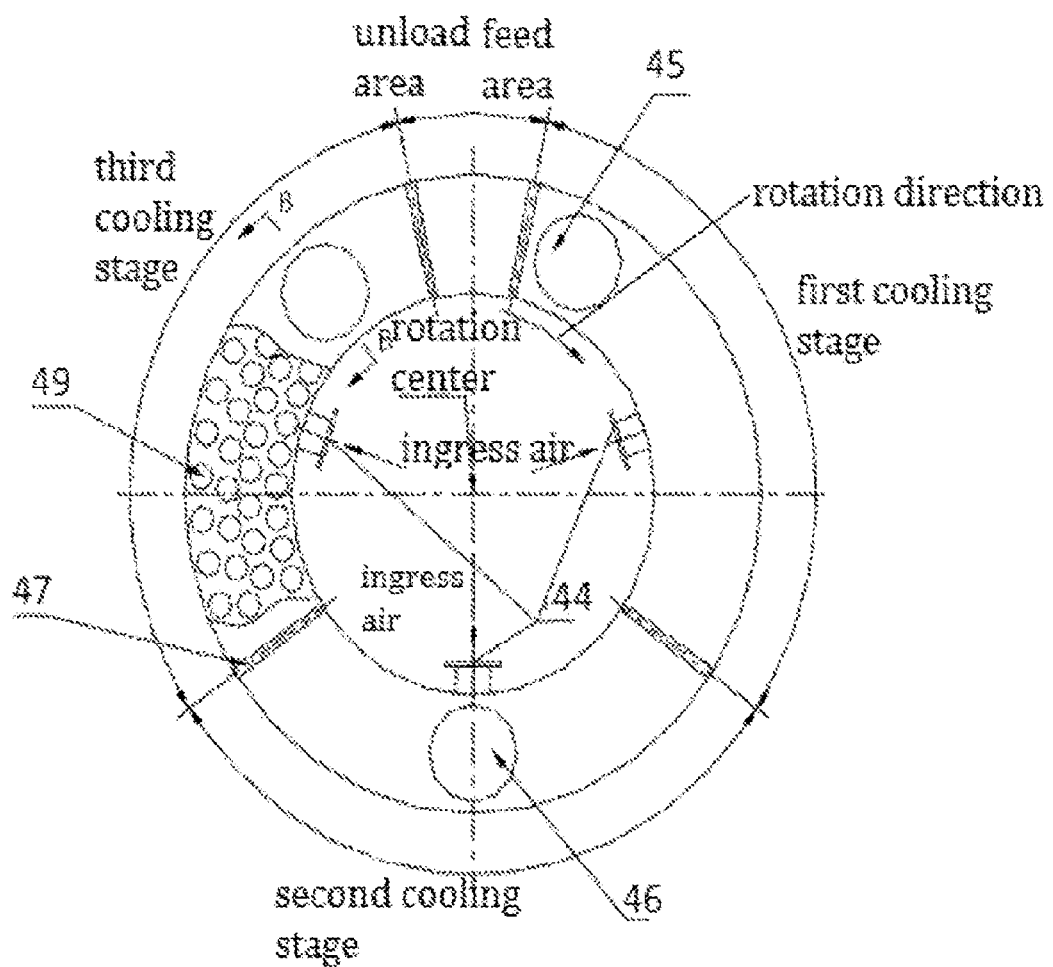
FIG. 15 is an operation schematic diagram (top view) of a device for cooling high-temperate slag balls in a specific embodiment of the present invention.
Figure 16:
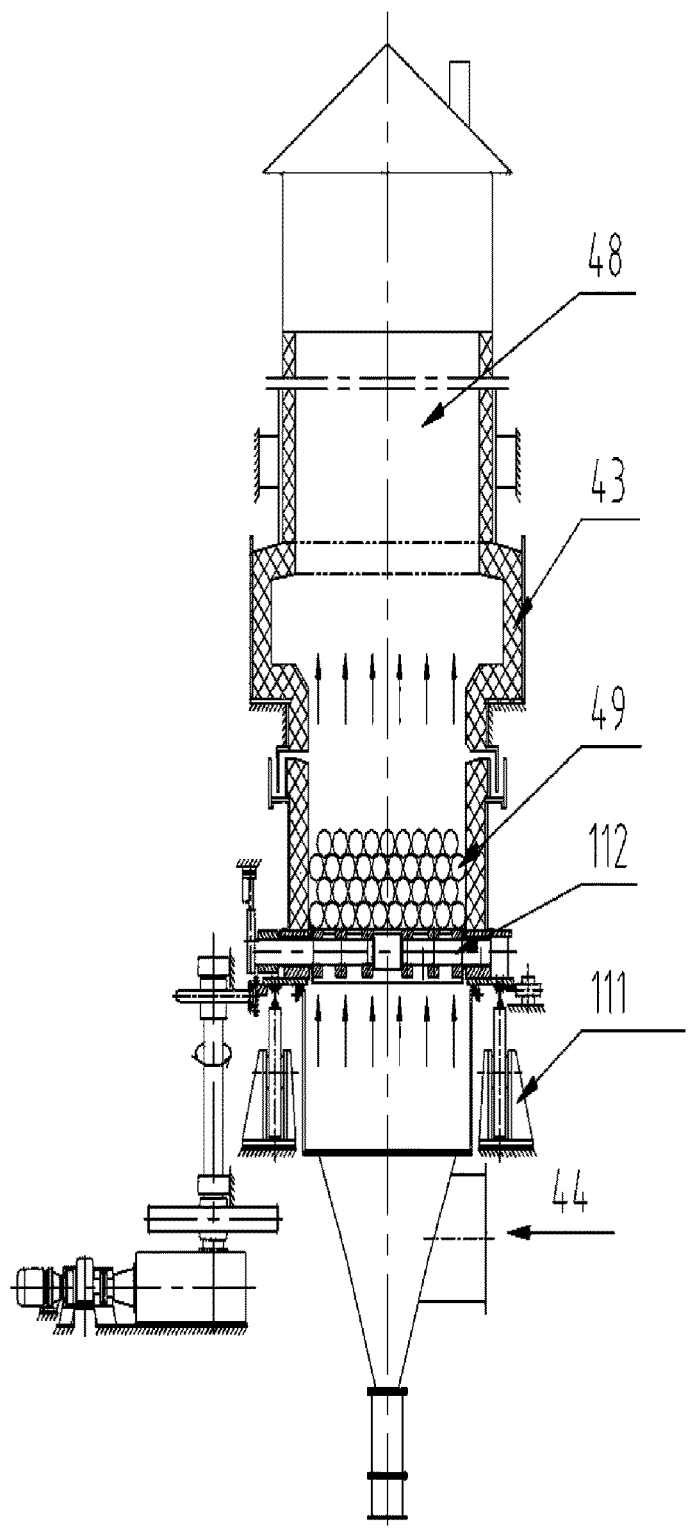
FIG. 16 is an enlarged sectional view taken along B-B of FIG. 15.
Figure 17:
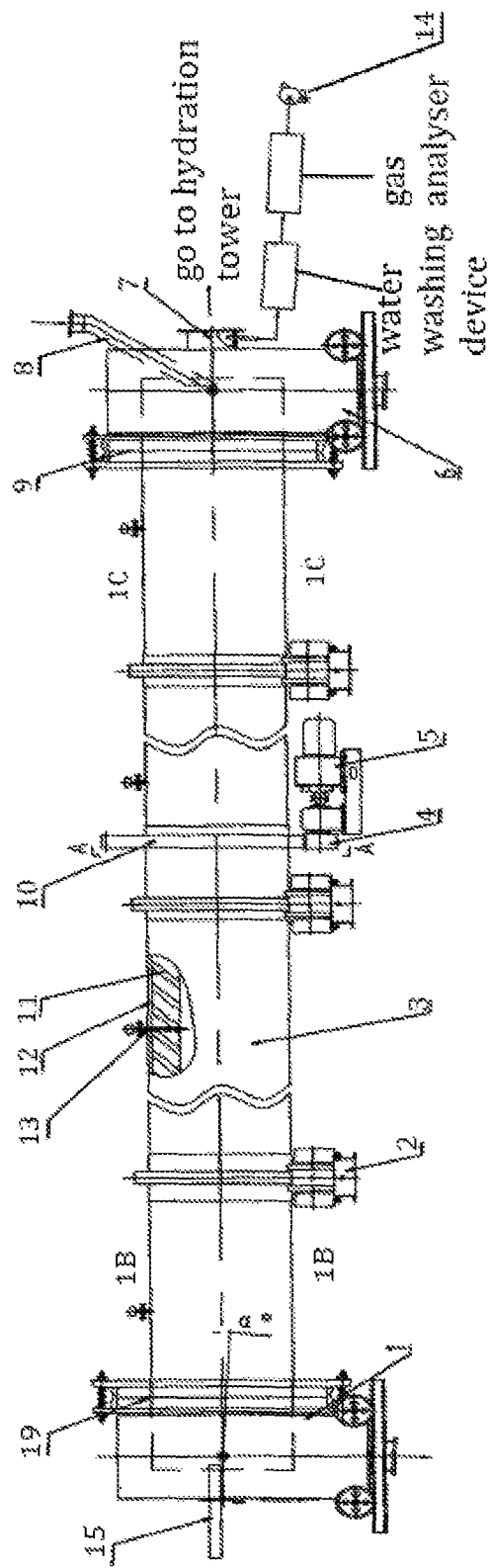
FIG. 17 is a flowchart of a method of comprehensively using high-temperature slag balls in a specific embodiment of the present invention.

As shown FIG. 17, a method of performing comprehensive utilization of the high-temperature slag balls exiting the rotary kiln after the above step 4 specifically comprises the following steps:

5.1 Delivering high-temperature slag balls 49 exiting the rotary kiln in the kiln process for producing phosphoric acid to the feed area of an annular cooler (or a belt-type cooler). As shown in FIG. 15 and FIG. 16, the annular cooler of the present embodiment comprises a supporting device 111, a trolley 112 and a housing 43, the trolley 112 is located on the supporting device 111, the housing 43 is erected above the trolley 112, the feed area and the unload area of the cooling device are both communicated with the trolley 112, and the high-temperature slag balls 49 are delivered onto the trolley 112 of the cooling device; the annular cooler is divided into three interconnected cooling stages in a circumferential direction; respective cooling stages are separated by a partition plate 47. The cooling stages are respectively provided with a cold air inlet 44 and a hot air outlet corresponding thereto; the cold air inlet 44 is disposed below the trolley 112, and the hot air outlet is disposed above the trolley 112; a gas flow passage between the cold air inlet 44 and hot air outlet passes through the trolley 112; a movement trajectory of the trolley 112 passes by the feed area, a plurality of cold air inlets 44 and the unload area in turn; each cooling stage comprises a first cooling stage adjacent to the feed area and a second cooling stage and a third cooling stage which are connected in turn, a first hot air outlet 45 of the first cooling stage is connected to a cavity of the rotary kiln via a first hot air delivery pipe, and a second hot air outlet 46 of the second cooling stage is connected to the cavity of the dryer via a second hot air delivery pipe; a third hot air outlet is correspondingly disposed in the third cooling stage.

5.2 The trolley 112 of the annular cooler rotates about a rotation center (the trolley is driven by a motor and a decelerator) to bring the high-temperature slag balls 49 into the first cooling stage in which a blower below the trolley 112 is used to introduce cold air in from the cold air inlet 44, the cold air passes through the trolley 112 located in the first cooling stage and performs heat exchange with the hot slag balls on the trolley 112 and meanwhile the residual carbon not used in the reaction in the high-temperature slag balls 49 burns away; after heat exchange in the first cooling stage, hot air discharged out of the first hot air outlet 45 corresponding to the first cooling stage (a temperature of hot air discharged out of the first hot air outlet 45 is controlled above 600° C.) is delivered through a first hot air delivery pipe into the cavity of the rotary kiln as a hot air source of combustion reduction reaction in the rotary kiln;

5.3 The trolley 112 rotates about a rotation center to bring the high-temperature slag balls 49 from the first cooling stage to the second cooling stage in which a blower below the trolley 112 is used to introduce cold air in from the cold air inlet 44, the cold air passes through the trolley 112 located in the second cooling stage and performs heat exchange with the hot slag balls on the trolley 112; after heat exchange of the second stage cooling stage, hot air discharged out of the second hot air outlet 46 corresponding to the second cooling stage (a temperature of hot air discharged out of the second hot air outlet 46 is controlled above 350° C.) is delivered through a second hot air delivery pipe into a composite green pellet dryer in the kiln process for producing phosphoric acid, as a hot air source for drying the composite green pellet;

5.4 The trolley 112, through rotation, brings the high-temperature slag balls 49 from the second cooling stage to the third cooling stage in which the blower below the trolley 112 is used to introduce cold air in from the cold air inlet 44, the cold air passes through the trolley 112 located in the third cooling stage and performs heat exchange with the hot slag balls on the trolley 112; after heat exchange, hot air discharged out of a third hot air outlet, after being dedusted, is directly exhausted through a chimney 48 (or delivered into the dryer); the cooled slag balls are discharged from the unload area. After being discharged from the unload area, the cooled slag balls are used as artificial ceramsites which are directly used as architecture material or used for planting and culturing flowers and green plants; or the cooled slag balls are ground so that above 80 percent of the ground material passes a 100 mesh, and then used as an active material for manufacturing concrete or a blend additive material for manufacturing cement.

6. Absorption of Phosphorus by Hydration and Recovery of Fluorine

Figure 18:
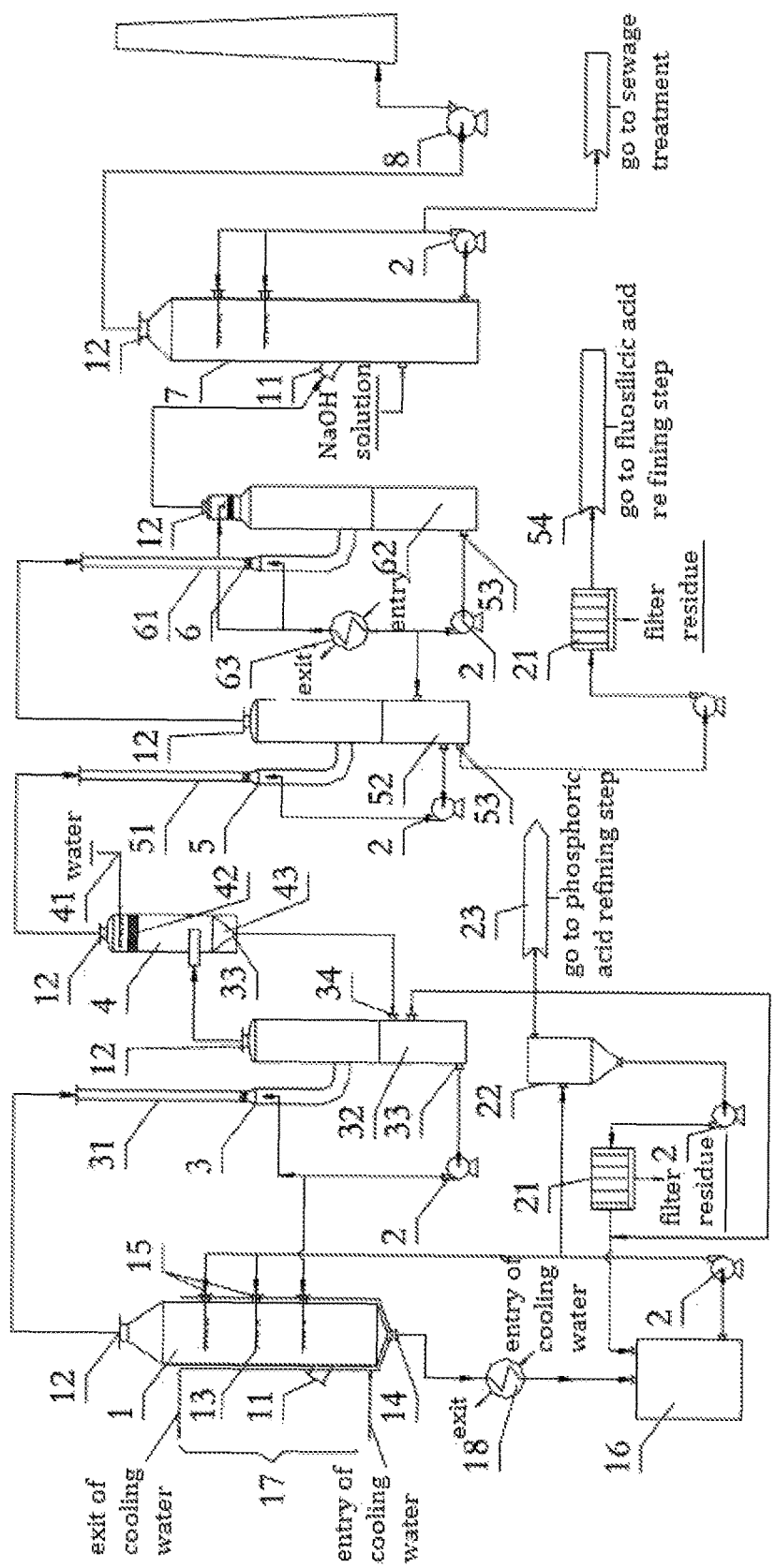
FIG. 18 is a structural schematic diagram of a process system of taking up phosphorus by hydration and recovering fluorine in a specific embodiment of the present invention.
Figure 19:
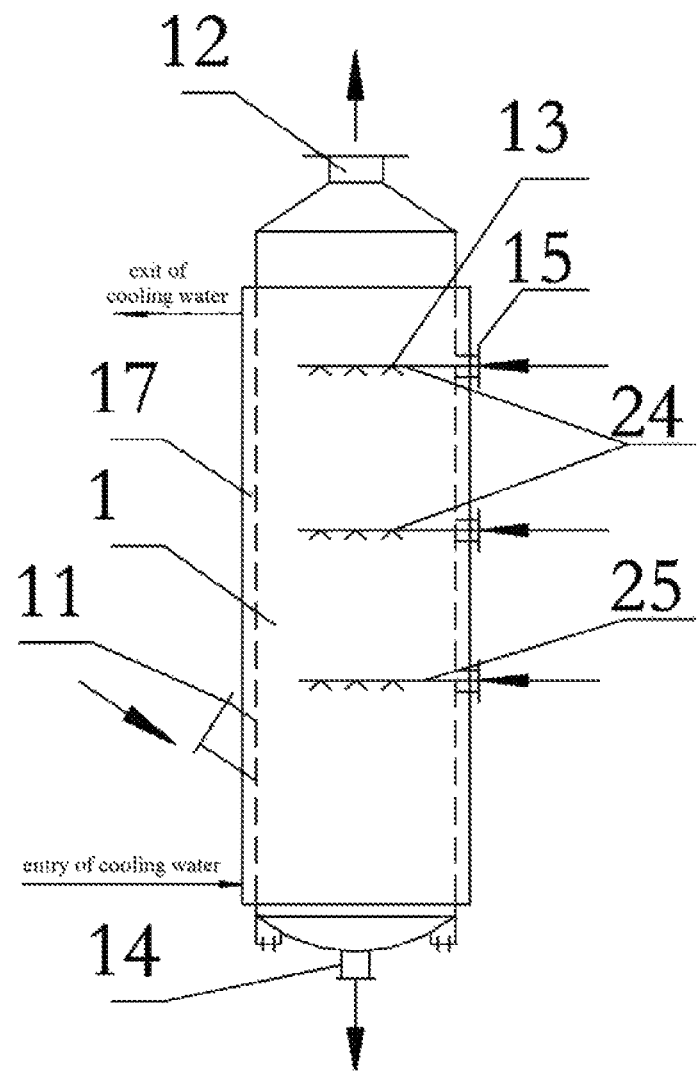
FIG. 19 is an enlarged structural schematic view of a hydration tower of a phosphoric acid-producing apparatus in a specific embodiment of the present invention.
Figure 20:
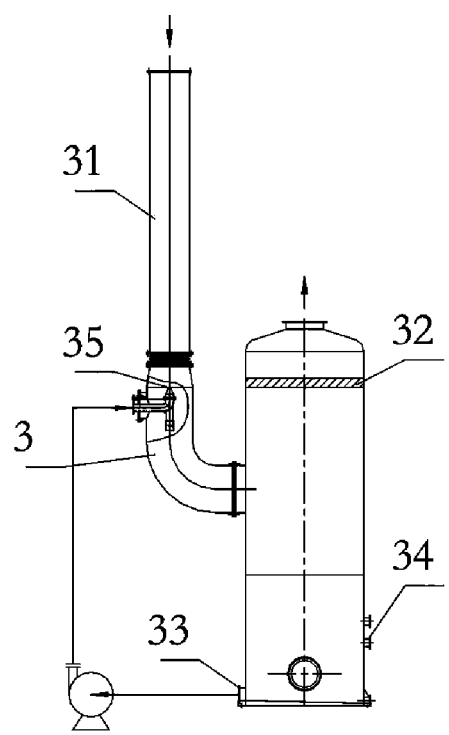
FIG. 20 is an enlarged structural schematic view of a phosphoric acid mist capturing tower of a phosphoric acid-producing apparatus in a specific embodiment of the present invention.

The step of absorbing phosphorus by hydration according to the present embodiment needs to use the following process system as shown in FIG. 18. The process system comprises a phosphoric acid preparation system and a fluorine recovering apparatus. The phosphoric acid preparation system used in the present embodiment comprises a hydration tower 1, an acid solution cyclical spraying system, a phosphoric acid mist capturing tower, and a mist removing and separating tower 4. A main body of the hydration tower 1 is a spraying empty tower (see FIG. 19). A fume inlet 11 of the fume exiting the kiln is disposed at a lower portion of the hydration tower 1, a fume outlet 12 after hydration and absorption is disposed at the top, a spraying device 13 is disposed in a cavity of the hydration tower 1 above the fume inlet 11, a liquid inlet 14 of the acid solution cyclical spraying system is disposed on a bottom of the hydration tower 1, a liquid outlet 15 of the acid solution cyclical spraying system is connected to a liquid intake pipe of the spraying device 13, and an acid solution storage tank 16 and a circulating pump 2 are further disposed in the acid solution cyclical spraying system. A water-cooling system 17 is provided around an outer wall of the cavity of the hydration tower 1 of the present embodiment, and the cooling water in the water-cooling system 17 enters from bottom and exits from top. In addition, an acid cooler 18 is disposed at a position of the acid solution cyclical spraying system adjacent to the fluid inlet 14; an outlet of the acid cooler 18 is connected with an inlet of the acid solution storage tank 16, an outlet of the acid solution storage tank 16 is connected with the liquid intake pipe of the spraying device 13 via the circulating pump 2 to thereby form an acid solution cyclical spraying system. The phosphoric acid mist capturing tower 3 is a fluid-state reverse-flow washing tower which mainly comprises a washing pipe 31 and a separation tank 32, the fume outlet 12 of the hydration tower 1 is communicated with an inlet of the washing pipe 31 via a pipe, an outlet of the washing pipe 31 is communicated with a middle portion of the separation tank 32, a top portion of the separation tower 32 is provided with the fume outlet 12, an acid solution outlet 33 is disposed on the bottom, the acid solution outlet 33 is communicated with a nozzle 35 in the washing pipe 31 via a circulating and delivering pipe with the circulating pump 2 (see FIG. 20), and the separation tank 32 also serves as an acid circulating tank of the circulating and delivering pipe of the phosphoric acid mist capturing tower 3.

To achieve acid crossflow of the hydration tower 1 and the phosphoric acid mist capturing tower 3, the spraying device 13 of the hydration tower in the present embodiment is provided with three spraying layers located at different heights of the cavity of the hydration tower 1, the three spraying layers comprise one a dilute phosphoric acid spraying layer 25 and two concentrated phosphoric acid spraying layers 24 (see FIG. 19), and the two concentrated phosphoric acid spraying layers 24 are disposed above the dilute phosphoric acid spraying layer 25; a liquid intake pipe of the concentrated phosphoric acid spraying layer 24 is communicated with the acid solution cyclical spraying system of the hydration tower 1, a liquid intake pipe of the dilute phosphoric acid spraying layer 25 is communicated with the circulating and delivering pipe of the phosphoric acid mist capturing tower 3 so as to achieve crossflow of the acid solution in the phosphoric acid mist capturing tower 3 to the hydration tower 1. In addition, the delivering pipe of the acid solution cyclical spraying system after the circulating pump 2 is connected to an acid solution inlet 34 of the phosphoric acid mist capturing tower 3 via a branch pipe. For coherence with subsequent filtration and refining step of phosphoric acid, the branch pipe is provided with a filler filtering device 22, an acid inlet of the filler filtering device 22 is communicated with the acid solution cyclical spraying system via the branch pipe, a filtering outlet of the filler filtering device 22 is divided into three paths: one path is communicated with the acid solution inlet 34 of the phosphoric acid mist capturing tower 3, a second path is communicated with an external phosphoric acid refining apparatus 23, and a third path is communicated with the acid solution storage tank 16; a bottom flow outlet of the filler filtering device 22 is connected to a feed port of a filter-pressing device 21 via a pipe, an overflow port of the filter-pressing device 21 is communicated with the acid solution storage tank 16 in the acid solution cyclical spraying system via a pipe to sufficiently achieve recovery and use of the phosphoric acid and ensure a high recovery rate of phosphoric acid. The bottom flow of the filler filtering device 22 is delivered regularly by a pump to the filter-pressing device 21 for filtration to remove solid substance existing in the acid solution cyclical spraying system.

The fume outlet 12 of the phosphoric acid mist capturing tower 3 is communicated with a lower portion of a mist removing and separating tower 4 through a pipe, a top of the mist removing and separating tower 4 is provided with the fume outlet 12 to discharge fume after the phosphors is absorbed by hydration, a bottom of the mist removing and separating tower 4 is provided an acid solution outlet 33, and the acid solution outlet 33 is communicated with an acid solution inlet 34 of the phosphoric acid mist capturing tower 3 via a pipe. An online water-washing device 41 is disposed in the mist removing and separating tower 4, water added to the online water-washing device 41 meanwhile may serve as replenish water for the whole process for manufacturing phosphoric acid by absorbing phosphorus by hydration, and is replenished level by level back to the upstream phosphoric acid mist capturing tower 3 and hydration tower 1 via a pipe. An upper portion of the mist removing and separating tower 4 is mounted with a wire mesh demister 42, a lower portion is designed as a phosphoric acid solution droplet capturing structure like a cyclone deduster, and the online water-washing device 41 is mounted above the wire mesh deduster 42.

The fluorine recovery apparatus used in the present embodiment comprises a primary fluorine absorbing tower 5 and a secondary fluorine absorbing tower 6. The primary fluorine absorbing tower 5 and the secondary fluorine absorbing tower 6 both employ a liquid-state reverse-flow washing tower. The primary fluorine absorbing tower 5 mainly comprises a fluosilicic acid washing pipe 51 and a fluosilicic acid separating tank 52, an inlet of the fluosilicic acid washing pipe 51 is communicated with a delivery pipe of fume after the phosphorus is absorbed by hydration, an outlet of the fluosilicic acid washing pipe 51 is communicated with a middle portion of the fluosilicic acid separating tank 52, a fume outlet 12 is disposed on top of the fluosilicic acid separating tank 52, a fluosilicic acid solution outlet 53 is disposed on the bottom, the fluosilicic acid solution outlet is communicated with a nozzle 35 in the fluosilicic acid washing pipe 51 via the circulating and delivering pipe having a circulating pump 2, and fluosilicic acid separating tank 52 also serves as an acid circulating tank of the circulating and delivering pipe. The structure of the secondary fluorine absorbing tower 6 is similar to the primary fluorine absorbing tower 5, the secondary fluorine absorbing tower 6 mainly comprises a secondary fluosilicic acid washing pipe 61 and a secondary fluosilicic acid separating tank 62, the fume outlet 12 of the primary fluorine absorbing tower 5 is communicated with an inlet of the secondary fluosilicic acid washing pipe 61, an outlet of the secondary fluosilicic acid washing pipe 61 is communicated with a middle portion of the secondary fluosilicic acid separating tank 62, a fume outlet 12 is disposed on top of the secondary fluosilicic acid separating tank 62, a fluosilicic acid solution outlet 53 is disposed on the bottom, and the fluosilicic acid solution outlet 53 is communicated with a nozzle 35 in the secondary fluosilicic acid washing pipe 61 via the circulating and delivering pipe having a circulating pump 2. A fluosilicic acid cooler 63 is further provided on the circulating and delivering pipe of the primary fluorine absorbing tower 6, an inlet of the fluosilicic acid cooler 63 is connected with the circulating pump 2 and its outlet is divided into two paths: one path is communicated with the nozzle 35 in the secondary fluosilicic acid washing pipe 61, the other path is communicated with a spraying layer at the top of the secondary fluosilicic acid separating tank 62, and the secondary fluosilicic acid separating tank 62 also serves as an acid circulating tank of the circulating and delivering pipe. An outlet of the circulating pump 2 of the secondary fluorine absorbing tower 6 is connected with a liquid inlet of the fluosilicic acid separating tank 52 of the primary fluorine absorbing tower 5 via a branch pipe, thereby allowing redundant fluosilicic acid solution of the secondary fluorine absorbing tower 6 to crossflow to the primary fluorine absorbing tower 5. To achieve emission of all pollutants by standard, an exhaust gas absorbing tower 7 is finally connected in the fluorine recovery apparatus according to the present embodiment, the exhaust gas absorbing tower 7 is a spraying empty tower, the fume outlet of the secondary fluorine absorbing tower 6 is communicated with the fume inlet 11 of the exhaust gas absorbing tower 7 via a pipe. A fume outlet 12 is disposed at the top of the exhaust gas absorbing tower 7, a spraying layer is disposed at an upper portion in the tower, a bottom in the tower is provided with a sodium hydroxide absorption liquid box whose outlet is connected with the respective spraying layers of the exhaust gas absorbing tower 7 via the circulating and delivering pipe having the circulating pump 2 to thereby form an exhaust gas absorbing, cyclical spraying system. The fluosilicic acid solution outlet 53 is additionally connected with an external fluosilicic acid refining apparatus 54 (or a villiaumite processing apparatus) via a feed pipe having a feeding pump, filter-pressing treatment is performed first through the filter-pressing device 21 prior to the fluosilicic acid refining apparatus 54, and an overflow port of the filter-pressing device 21 is then connected to the fluosilicic acid refining apparatus 54 via a pipe.

On the basis of the process system shown in FIG. 18 according to the present embodiment, a method of absorbing phosphorus by hydration and recovering fluorine from fume exiting the kiln in the kiln phosphoric acid producing process according to the present embodiment specifically comprises the following steps:

6.1 Absorption of $P_2O_5$ by Hydration in the Hydration Tower

The fume exiting the kiln (the content of $P_2O_5$ is 80 g/Nm³) containing $P_2O_5$ and fluorine and having a temperature 500° C. after the above step 4 is introduced into the tower through the fume inlet 11 in the lower portion of the hydration tower 1, the circulating pump 2 of the acid solution cyclical spraying system is started previously, so that concentrated phosphoric acid solution in the hydration tower 1 is sprayed through upper and intermediate concentrated phosphoric acid spraying layers 24, partial nozzles of the uppermost concentrated phosphoric acid spraying layer 24 spray towards an inner wall from slantly underneath and remaining nozzles spray vertically downward, nozzles of the intermediate and lower spraying layers spray vertically downward, the sprayed concentrated phosphoric acid solution is in full contact with fume reverse flow entering the tower and containing $P_2O_5$ and fluorine for mass transfer and heat transfer, $P_2O_5$ in the fume is subjected to chemical reaction with water in the concentrated phosphoric acid solution to produce phosphoric acid, more than half of the produced phosphoric acid is absorbed into the spraying liquid, the remaining portion forms phosphoric acid mist and remains in gas phase; it is very difficult that fluorine (such as $SiF_4$ and HF) in the fume is absorbed in the spraying liquid under the condition of concentrated phosphoric acid and a higher temperature; the temperature of the fume, after passing through heat transfer with the cyclically-sprayed lower-temperature concentrated phosphoric acid solution and the cooling by the water-cooling system 17 in the hydration tower 1, drops to 75-130° C., and the temperature of cyclic concentrated phosphoric acid solution exiting the hydration tower 1 is raised to 70-95° C. According the moisture content in the fume, a mass percentage concentration of the cyclically-sprayed concentrated phosphoric acid solution is selected from a range 60%-90% (phosphoric acid solution with 70%-85% concentration is employed in the present embodiment), the temperature of the concentrated phosphoric acid solution upon entering the hydration tower is controlled in a range of 50-80° C., and a spraying liquid-gas ratio is controlled in a range of 3 $L/m^3$-20 $L/m^3$. The fume exiting the tower entrains much phosphoric acid mist exiting in the form of mist, which cannot settle in the hydration tower 1 and is carried out of the hydration tower 1 along with the fume. The hydration tower 1 has double functions of cooling fume and absorbing $P_2O_5$ by hydration, wherein a chemical reaction mainly occurring is as follows:

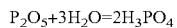

$$P_2O_5+3H_2O=2H_3PO_4$$

The concentrated phosphoric acid solution sprayed and falling down in the hydration tower 1 finally enters the acid solution cyclical spraying system through the liquid inlet 14, then flows in the acid cooler 18, the acid cooler 18 is structured in a way that several heat exchange plates made of stainless steel pipe are arranged in an agitation tank, cyclical cooling water is introduced in the pipes; through agitation, the phosphoric acid solution entering the acid cooler 18 forms forced convection and heat exchange on the heat exchange plates, thereby improving the heat transfer efficiency; a caloric content portion in the concentrated phosphoric acid is transferred to the cyclic cooling water of the acid cooler 18, and the cyclic cooling water constantly transfers the heat of the cyclic concentrated phosphoric acid solution. The cyclical acid solution flowing out of the outlet of the acid cooler 18 enters the phosphoric acid storage tank 16 and sent by the circulating pump 2 again to respective nozzles of the upper and intermediate concentrated phosphoric acid spraying layers 24 for cyclical spraying.

6.2 Capture of Phosphoric Acid Mist in the Phosphoric Acid Mist Capturing Tower

The gas phase substance (namely fume) discharged out of the fume outlet 12 at the top of the hydration tower 1 enters the washing pipe 31 of the phosphoric acid mist capturing tower 3. The tower is a fluid-state reverse-flow washing tower. The cyclical dilute phosphoric acid solution is sprayed from down to up in the washing pipe 31, the dilute phosphoric acid solution impinges and contacts with the up-down high-speed fume flow to form a strong turbulence area at a gas-liquid interface area, fluid momentum, after reaching balance, establishes a stable foam area (foam column) having a certain height, the fume passes through the foam area and contacts a large-area phosphoric acid liquid surface which updates constantly, capture, polymerization and growth of particles and heat transfer occurs in the foam area, a majority of phosphoric acid mist entrained in the fume is transferred to the cyclical dilute phosphoric acid solution, a fume appearance flow rate in the absorption area is 10 m/s-30 m/s, and the liquid-gas ratio is 3 $L/m^3$-25 $L/m^3$. The temperature of the fume, through evaporation of moisture content in the cyclical dilute phosphoric acid solution in a heat insulation manner, further falls to 60-75° C. As compared with a conventional heat-method phosphoric acid Venturi demister, to achieve the same mist removing effect, the phosphoric acid mist capturing tower according to the present invention substantially reduces loss of dynamic pressure head and decrease energy consumption of the acid collecting device.

The cyclically sprayed acid solution in the phosphoric acid mist capturing tower 3 employs dilute phosphoric acid solution with 10%-50% mass percentage concentration, gas and liquid in the washing pipe 31 enters the separating tank 32 in the lower portion of the tower for gas-liquid separation, the cyclical acid solution falls into the bottom of the separating tank 32, the separating tank 32 of the tower meanwhile serves as a cyclic acid tank, and the dilute phosphoric acid solution at the bottom is delivered back from the circulating pump 2 to the washing pipe 31 or crossflows into the dilute phosphoric acid spraying layer 25 of the hydration tower 1 according to needs.

6.3 Capturing of the Phosphoric Acid Mist in the Mist Removing and Separating Tower The fume discharged out of the fume outlet 12 in the phosphoric acid mist capturing tower 3 enters the mist removing and separating tower 4 for further gas-liquid separation to further remove phosphoric acid mist in the fume, the lower portion of the mist removing and separating tower is designed a phosphoric acid liquid droplet capturing structure similar to a cyclone deduster, a centrifugal force is utilized to capture already grownup phosphoric acid droplets from the fume, a wire mesh demister 42 is mounted at an upper portion of the mist removing and separating tower to further capture not-yet-grownup phosphoric acid mist droplets in the fume to ensure a direct recovery rate of $P_2O_5$ of the apparatus; fume from which phosphorus is absorbed by hydration, discharged out of the mist removing and separating tower 4, is delivered to the fluorine recovery apparatus for fluorine recovery treatment.

Since water is consumed to chemically combine $P_2O_5$ in the fume during absorption of phosphorus by hydration, and furthermore, partial moisture content is evaporated from the spraying acid solution in the course of reducing the temperature of the fume, water needs to be replenished constantly during absorption by hydration. The quantity of water to be replenished in the process system in the present embodiment is totally replenished from the fume outlet 12 of the mist removing and separating tower 4. At this time, the online water-washing device 41 not only serves as a water replenishing device and meanwhile serves as a washing device of the wire mesh demister on the upper portion of the mist removing and separating tower 4. Since all the replenished water is added to the mist removing and separating tower 4, and the bottom liquid in the mist removing and separating tower 4 flows through the acid solution inlet 34 of the phosphoric acid mist capturing tower 3 back into the phosphoric acid mist capturing tower 3, so the concentration of the cyclic acid solution in the phosphoric acid mist capturing tower 3 will gradually falls. On the other hand, since $P_2O_5$ in the fume is constantly absorbed in the hydration tower 1, the concentration of the cyclical acid solution therein gradually increases. Hence, crossflow of acid is needed for the cyclic acid solution system of the hydration tower 1 and the phosphoric acid mist capturing tower 3 to keep concentration of respective cyclical acid solutions stable. The acid crossflowing from the hydration tower 1 to the phosphoric acid mist capturing tower 3 is clarified and filtered in the filler filtering device 22 and then introduced to the phosphoric acid capturing tower 3, and acid crossflowing from the phosphoric acid mist capturing tower 3 to the hydration tower 1 is directly introduced out from the outlet of the circulating pump 2 of the phosphoric acid mist capturing tower 3. Since the cyclic acid solution in the hydration tower absorbs impurities such as dust in the fume, to avoid accumulation of these impurities, redundant acid solution (acid yield corresponding to material balance) needs to be introduced out of the acid solution cyclical spraying system of the hydration tower 1, and passes through the filler filtering device 22 for clarification and filtering (primary filtering), the clarified acid solution partially crossflows to the phosphoric acid mist capturing tower 3 and the remaining part thereof enters the refining step as crude phosphoric acid, active carbon, diatomite and barium salt are added, color and $SO_4^{2-}$ of the crude phosphoric acid are removed, and then a plate-and-frame filter-pressing device 21 (secondary filtering) is used to remove impurities and perform purification to obtain the concentrated phosphoric acid product.

6.4 Primary Fluorine Absorption

The fume after absorption of phosphorus by hydration is delivered to the fluosilicic acid washing pipe 51 of the primary fluorine absorbing tower 5, most fluorine (mainly, silicon tetrafluoride) in the fume goes from up to down and comes into sufficient gas and liquid two-phase contact with the cyclical fluosilicic acid solution (mass percentage concentration is 10%-20%) sprayed in from down to up and performs mass transfer, heat transfer and chemical reaction, most fluorine in the fume reacts with water to produce fluosilicic acid, and meanwhile caloric content in the fume is, through heat transfer, mostly transferred to the cyclical fluosilicic acid solution; the fume, through evaporation of moisture content in the cyclical fluosilicic acid solution in a heat insulation manner, further falls to 50-70° C.; a chemical reaction mainly occurring in this step is as follows:

$$3SiF_4 + 3H_2O = 2H_2SiF_6 + SiO_2 \cdot H_2O.$$

6.5 Primary Gas-Liquid Separation

The product finally obtained in the fluosilicic acid washing pipe 51 is totally transferred to the fluosilicic acid separating tank 52 for gas-liquid separation, gas after separation enters the secondary fluosilicic acid washing pipe 61 of the secondary fluorine absorbing tower 6 through the fume outlet of the primary fluorine absorbing tower 5, liquid after separation stays in the fluosilicic acid separating tank 52 and is delivered through the cyclical delivering pipe having the circulating pump back to fluosilicic acid washing pipe 51 to perform operation in the above step 4.

6.6 Secondary Fluorine Absorption

The fume entering the secondary fluosilicic acid washing pipe 61 (a majority of the remaining fume is fluorine-containing substance, mainly $SiF_4$) goes from up to down and comes into sufficient gas and liquid two-phase contact with the cyclical fluosilicic acid solution (mass percentage concentration is 0.5%-1.5%) sprayed in from down to up and performs mass transfer, heat transfer and chemical reaction to produce fluosilicic acid, meanwhile caloric content in the fume is, through heat transfer, mostly transferred again to the cyclical fluosilicic acid solution; a temperature of the product after treatment in step (3) further falls below 60° C.; the chemical reaction mainly occurring in this step is identical with that in step 4.

6.7 Secondary Gas-Liquid Separation

The product finally obtained in the secondary fluosilicic acid washing pipe 61 is totally transferred to the secondary fluosilicic acid separating tank 62 for gas-liquid separation, a demisting unit is disposed on top of the secondary fluosilicic acid separating tank 62 to remove mist entrained in the fume to improve the absorption rate of fluorine, and the demisting unit is cleaned by spraying in cyclical fluosilicic acid solution from the top. The separated gas goes through the fume outlet of the secondary fluorine absorbing tower 6 into the subsequent exhaust gas absorbing tower 7 for treatment. The separated liquid stays in the secondary fluosilicic acid separating tank 62 and is delivered back to the secondary fluosilicic acid washing pipe 61 via the cyclical delivering pipe having the circulating pump 2 to perform the operation in the above step 6, the cyclical delivering pipe is mounted with a fluosilicic acid cooler 63 so as to remove partial heat in the cyclical fluosilicic acid solution so that fluorine absorption reaction is performed at a more suitable temperature. The cyclical fluosilicic acid solution entering the secondary fluosilicic acid washing pipe 61 is subjected to the cooling treatment of the fluosilicic acid cooler 63 (a conventional cooling apparatus); partial redundant cyclical fluosilicic acid solution may be directly discharged into the fluosilicic acid separating tank 52 of the primary fluorine absorbing tower 5.

The cyclical fluosilicic acid solution in the primary fluorine absorbing tower 5 and the secondary fluorine absorbing tower 6 is accumulated as absorbing fluorine (mainly, $SiF_4$) in the fume, concentration of fluosilicic acid in the primary fluorine absorbing tower 5 increases as absorbing $SiF_4$ in the fume, the redundant cyclical fluosilicic acid solution in the secondary fluorine absorbing tower 6 is discharged into the primary fluorine absorbing tower 5 to maintain its concentration constant, finally the redundant cyclical fluosilicic acid solution in the primary fluorine absorbing tower 5 is delivered via a feeding pump to the filter-pressing device 21 to perform filter-pressing to remove solid substances such as silica gel therein, the filtrate goes through the fluosilicic acid refining step to produce fluosilicic acid final product (with a concentration of 12% or so) or is processed into villiaumite product; the filtration residue is silica gel and cleaned to remove impurities to serve as a by-product.

6.8 Exhaust Gas Absorbing and Purifying Treatment

The fume entering the subsequent exhaust gas absorbing tower 7 comes into reverse-flow contact with downwardly-sprayed NaOH solution during upward movement of the exhaust gas absorbing tower 7, an absorption liquid tank on the bottom of the exhaust gas absorbing tower 7 is connected with respective spraying layers in the tower via the circulating pump 2 to form a cyclical spraying system; to keep the absorbing capability of the absorption liquid, pH value of the absorption liquid is maintained above 8, and dilute NaOH solution needs to be added constantly. However, the absorption liquid is accumulated as the dilute NaOH solution is added and impurities in the fume such as $P_2O_5$ and fluorine are absorbed, it needs to be discharged constantly for sewage treatment, and water recovered from the treatment may be used to the raw material step of the kiln phosphoric acid production process; the remaining pollutants in the fume such as $P_2O_5$, $SiF_4$ and dusts are absorbed by the spraying liquid, the fume is further cleaned and purified to reach the state emission standard (the fluorine content in the gas falls below 9 mg/m$^3$), and then discharged by an induced draft fan to the chimney for emission. Chemical reactions mainly occurring in this step are as follows:

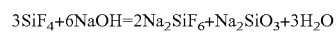
$$3SiF_4 + 6NaOH = 2Na_2SiF_6 + Na_2SiO_3 + 3H_2O$$

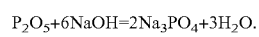
$$P_2O_5 + 6NaOH = 2Na_3PO_4 + 3H_2O.$$

What are described above are only preferred embodiments of the present invention. Equivalent modifications, variations and improvements made on the basis of the above technical solutions all fall within the protection scope of the present invention.

The invention claimed is:
1. An improved method for mass producing phosphoric acid with a rotary kiln, comprising the following steps:
  (1) pretreating raw materials carbonaceous reductant, phosphate ore and silica respectively with a carbonaceous reductant pretreatment system, a phosphate ore pretreatment system and a silica pretreatment system;
  a process procedure of the carbonaceous reductant pretreating system comprises:
    crushing the carbonaceous reductant to below 30 mm in granularity by a single-stage crushing device, and then
    delivering the crushed material to a carbonaceous reductant intermediate bin which delivers the crushed material to an ore grinding device via a weighing and feeding device for grinding;
    after the ore grinding device grinds the fed material to a granularity meeting a process requirement, collecting the powder material by a combined dust collector comprised of a cyclone powder-collecting device and a pouch powder-collecting device; and
    delivering the powder material to the carbonaceous reductant powder storage bin;
    wherein hot air is replenished constantly via a configured hot air furnace during grinding so as to remove moisture entrained in the powder material; and/or,
  a process procedure of the phosphate ore pretreating system comprises:
    crushing the phosphate ore to below 30 mm in granularity by a single-stage crushing device; and then
    delivering the crushed material to a phosphate ore intermediate bin which delivers the crushed material to an ore grinding device via a weighing and feeding device for grinding;
    after the ore grinding device grinds the fed material to a granularity meeting a process requirement, collecting the powder material by a combined dust collector comprised of a cyclone powder-collecting device and a pouch powder-collecting device; and
    delivering the powder material to a homogenization silo;
    wherein hot air is replenished constantly via a configured hot air furnace during grinding so as to remove moisture entrained in the powder material; and/or,
  a process procedure of the silica pretreating system comprises:
    crushing silica to below 30 mm in granularity by a single-stage crushing device or a dual-stage one-closed-loop crushing device, and then
    delivering the crushed material to a silica intermediate bin which delivers the crushed material to an ore grinding device via a weighing and feeding device for grinding;
    after the ore grinding device grinds the fed material to a granularity meeting a process requirement, collecting the powder material by a combined dust collector comprised of a cyclone powder-collecting device and a pouch powder-collecting device; and
    delivering the powder material to a silica powder storage bin;
    wherein hot air is replenished constantly via a configured hot air furnace during grinding so as to remove moisture entrained in the powder material;
  (2) mixing the carbonaceous reductant powder, phosphate ore powder and silica powder obtained in step (1) and a binding agent according to a proportional requirement,
    feeding the mixed material into a pelleting machine for pelleting treatment, and
    obtaining inner balls upon completion of the pelleting;
  (3) mixing the carbonaceous reductant powder and silica power obtained in step (1) and a binding agent according to proportional requirements to obtain a cladding material;
    screening the inner balls obtained in step (2) to obtain inner balls with a granularity meeting the process requirement,
    feeding screened inner balls into another pelleting machine for cladding treatment,
    introducing the cladding material in said another pelleting machine;
    obtaining composite green pellets upon completion of the cladding treatment;
    delivering the composite green pellets into a dryer for drying and solidification to obtain the composite pellets;
  (4) introducing the composite pellets obtained in step (3) into a cavity of the rotary kiln;
    reducing the composite pellets in the rotary kiln by the carbonaceous reductant at a high temperature to generate kiln fume,
    wherein an outlet flue is arranged in a way that the fume exiting the kiln at the kiln tail of the rotary kiln does not deviate much in a movement direction upon entering the outlet flue, thereby preventing metaphosphoric acid in the fume exiting the kiln from generating centrifugal physical settlement at the tail of the rotary kiln so that the metaphosphoric acid in the kiln gas directly enters a subsequent hydration tower along with the fume exiting the kiln;
  (5) introducing the fume exiting the kiln containing $P_2O_5$ and fluorine into the hydration tower;
    bringing the fume exiting the kiln in sufficient contact with a concentrated phosphoric acid solution sprayed downwardly in a way of reverse-flow for mass transfer and heat transfer, wherein $P_2O_5$ in the fume is subjected to chemical reaction with water in the sprayed concentrated phosphoric acid solution to produce phosphoric acid.

2. The method according to claim 1, wherein the single-stage crushing device employs a hammer-type crusher or an impact type crusher, or employs a combined type crusher comprising a hammer type crusher and an impact type crusher; the dual-stage one-closed-loop crushing device comprises a jaw crusher, a screening machine and a cone crusher which are connected in turn, and a discharge port of the cone crusher is cyclically connected to a feed port of the screening machine; and/or
  the ore grinding device in the carbonaceous reductant pretreatment system employs a vertical grinder or an air swept mill; the ore grinding device in the phosphate ore pretreatment system employs a vertical grinder or an air swept mill; the ore grinding device in the silica pretreatment system employs a ball grinder and/or a high-pressure roller press; and/or,
  the homogenization silo is a gap type homogenization silo or a continuous homogenization silo, and the homogenization silo employs compressed air to stir the powder material in the silo uniform with a homogenization value greater than or equal to 4.

3. The method according to claim 1, wherein the mixing the carbonaceous reductant powder, phosphate ore powder and silica powder obtained in step (1) and a binding agent according to a proportional requirement comprises: adding the carbonaceous reductant powder, phosphate ore powder and silica powder obtained in step (1) to an intensive mixer or a damp mill according to a proportional requirement, and meanwhile adding a binding agent; and the feeding the mixed material into a pelleting machine for pelleting treatment comprises: feeding the mixed material which is mixed sufficiently and uniformly by a weighing and feeding device into the pelleting machine for pelleting treatment, and additionally adding the binding agent in a form of droplets and/or mist, wherein an addition amount of the binding agent is 1%-10% of mass of the mixed material.

4. The method according to claim 1, wherein the mixing the carbonaceous reductant powder and silica power obtained in step (1) and a binding agent according to proportional requirements comprises: adding the carbonaceous reductant powder and silica power obtained in step (1) to another intensive mixer according to proportional requirements; meanwhile adding a binding agent, and mixing them sufficiently to obtain a cladding material;

the screening the inner balls obtained in step (2) comprises: subjecting the inner balls obtained in step (2) to a bi-layered roller-type screening treatment to obtain inner balls with a granularity meeting the process requirement, the introducing the cladding material in said another pelleting machine comprises: introducing the cladding material by an electronic weighing and feeding device in said another pelleting machine according to a corresponding proportion set with respect to the inner ball material, and additionally adding the binding agent in a form of droplets and/or mist during the cladding treatment, wherein the addition amount of the binding agent is 1%-12% of the mass of the cladding material.

5. The method according to claim 1, wherein in said step (2) and said step (3), the binding agent is a mixed solution containing sodium humate, the sodium humate in the binding agent has a 4%-20% mass percentage concentration; preparation of the binding agent comprises the following steps: selecting coal material including humic acid and caustic soda as raw materials, mixing the caustic soda and water to produce NaOH solution by proportion; ball grinding and mixing the coal material with the NaOH solution in a 1:3-10 solid-liquid ratio; agitating and heating the mixed material to 40-95° C. to perform syntheses reaction for not less than 30 min; filtering the reaction products to obtain filtrate as the binding agent.

6. The method according to claim 3, wherein the intensive mixer includes an obliquely rotatable mixing barrel, a rotatable agitator is mounted in the mixing barrel; upon mixing, a rotation direction of the mixing barrel is contrary to a rotation direction of the agitator to allow the mixed materials in the mixing barrel to form a turbulence therein, thereby achieving an effect of agitating sufficiently and uniformly;

the pelleting machine is a disc type pelleting machine; inner balls not meeting the process granularity requirement screened out in said step (3) all are fed into a roller mill or damp mill for milling, the inner ball material is selectively added according to a requirement for material humidity during milling, and then returns into the intensive mixer or damp mill to form closed-loop circulation.

7. The method according to claim 1, wherein the dryer used in said step (3) is a scale plate dryer, and the scale plate dryer is divided into a total of three drying stages in a delivery direction of the composite green pellets, including a low-temperature drying stage, an intermediate-temperature drying stage and a high-temperature drying stage;

low-temperature hot air with a temperature of 100-200° C. introduced into the low-temperature drying stage performs up-down air pumping or down-up wind blowing so that the low-temperature hot air vertically passes through a material layer and performs through-drying for the composite green pellets; the low-temperature hot air originates from exhaust gas discharged at a high-temperature hot air outlet of the high-temperature drying stage;

intermediate-temperature hot air with a temperature of 150-250° C. introduced into the intermediate-temperature drying stage performs up-down air pumping or down-up wind blowing so that the intermediate-temperature hot air vertically passes through the material layer and performs through-drying for the composite green pellets;

high-temperature hot air with a temperature of 200-350° C. introduced into the high-temperature drying stage performs up-down air pumping or down-up wind blowing so that the high-temperature hot air vertically passes through the material layer and performs through-drying for the composite green pellets.

8. The method according to claim 1, wherein the composite pellets obtained in step (3) is introduced into the cavity of the rotary kiln through a feed pipe at the kiln tail of the rotary kiln, wherein the reducing the composite pellets in the rotary kiln comprises igniting a fuel burner to heat a reduction zone in the rotary kiln to 1300-1450° C.;

wherein high-temperature slag balls exiting the rotary kiln are delivered to a cooling device for comprehensive utilization.

9. The method according to claim 1, wherein the rotary kiln comprises a kiln body, a kiln head box, a kiln tail box and a driving device for driving the kiln body to rotate, at the kiln head of the kiln body is provided a fuel burner, at the kiln tail box are provided a feed pipe and an outlet flue connected to an external hydration tower, an upper portion of the kiln body is not provided with a wind tube, the outlet flue is disposed in a scope of radius of the kiln body with an axis of the rotary kiln as a center, and a fume delivery direction in the outlet flue is substantially parallel to the axial direction of the rotary kiln or at an angle of less than 45° relative to the axial direction of the rotary kiln.

10. The method according to claim 9, wherein the kiln body comprises an external cylinder casing and a kiln liner disposed inside the cylinder casing, the kiln body is divided into a reduction zone and a preheating zone in a lengthwise direction of the rotary kiln, the reduction zone is close to the kiln head box, the preheating zone is close to the kiln tail box, a length of the reduction zone is ⅓-⅗ of a length of the kiln body, and a length of the preheating zone is ⅖-⅔ of the length of the kiln body; the kiln liner mainly comprises a composite refractory brick or a composite refractory pouring material, the kiln liner located in the reduction zone comprises a clay material layer adjacent to the cylinder casing and a high alumina material layer adjacent to an inner cavity of the rotary kiln; the kiln liner located in the preheating zone comprises a clay material layer adjacent to the cylinder casing and a silicon carbide material layer adjacent to the inner cavity of the rotary kiln.

11. The method according to claim 10, wherein a kiln cleaning machine is disposed externally the kiln tail box, and a scraper is provided in the kiln-cleaning machine to progressively extend into the kiln tail box of the rotary kiln and keep scraping relative to an inner wall of the cavity; an axis of the rotary kiln forms an angle in a range of 1.7°-2.9° with a horizontal plane, a length-diameter ratio of the kiln body is 10-25:1, a filling rate of the rotary kiln is 7%-25%, and a rotation speed of the rotary kiln is controlled in a range of 0.6 r/min-3 r/min.

12. The method according to claim 8, wherein the method for comprehensive utilization comprises the following steps:
   (a) delivering the high-temperature slag balls exiting the rotary kiln in the kiln process for producing phosphoric acid to a feed area of a cooling device, the cooling device comprises a supporting device, a trolley and a housing, the trolley is located on the supporting device, the housing is erected above the trolley, the feed area and an unload area of the cooling device are both communicated with the trolley, and the high-temperature slag balls are delivered onto the trolley of the cooling device; the cooling device is divided into at least two interconnected cooling stages, each cooling stage is provided with a cold air inlet and a hot air outlet corresponding thereto; a gas flow passage between the cold air inlet and the hot air outlet passes through the trolley; a movement trajectory of the trolley passes by the feed area, a plurality of cold air inlets and the unload area in turn;
   (b) by rotating the trolley, bringing the high-temperature slag balls into a first cooling stage in which a blower below the trolley is used to introduce cold air from the cold air inlet, wherein the cold air passes through the trolley located in the first cooling stage and performs heat exchange with the hot slag balls on the trolley and meanwhile residual carbon not used in the reaction in the high-temperature slag balls burns away; after heat exchange in the first cooling stage, delivering hot air discharged from the first hot air outlet corresponding to the first cooling stage through a first hot air delivery pipe back to the cavity of the rotary kiln as a hot air source for burning a reduction reaction product in the rotary kiln;
   (c) by rotating the trolley, bringing the high-temperature slag balls from the first cooling stage to a second cooling stage in which a blower below the trolley is used to introduce cold air from the cold air inlet, wherein the cold air passes through the trolley located in the second cooling stage and performs heat exchange with the hot slag balls on the trolley; after heat exchange in the second stage cooling stage, delivering hot air discharged from the second hot air outlet corresponding to the second cooling stage through a second hot air delivery pipe into a composite green pellet dryer in the kiln process for producing phosphoric acid, as a hot air source for drying the composite green pellet;
   (d) by rotating the trolley, further bringing the high-temperature slag balls from the second cooling stage to subsequent remaining cooling stages in which a blower below the trolley is used to introduce cold air in from the cold air inlet, wherein the cold air passes through the trolley located in the remaining cooling stages and performs heat exchange with the hot slag balls on the trolley; after heat exchange in the remaining cooling stages, delivering hot air discharged from remaining hot air outlets, after being dedusted, into the composite green pellets dryer as a hot air source for drying or directly discharging the hot air discharged from remaining hot air outlets; and discharging the cooled slag balls from the unload area.

13. The method according to claim 1, wherein the method further comprises starting an acid solution cyclical spraying system connected with the hydration tower before introducing the fume exiting the kiln into the hydration tower, wherein the acid solution cyclical spraying system delivers concentrated phosphoric acid solution constantly in a spraying device in the hydration tower, the produced phosphoric acid is absorbed into the spraying liquid, the remaining portion forms phosphoric acid mist remains in gas phase, and the remaining fume in the hydration tower is discharged through its fume outlet; the phosphoric acid solution sprayed and falling down in the hydration tower enters the acid solution cyclical spraying system, first flows in an acid cooler, the cyclical acid solution flowing out of the outlet of the acid cooler is delivered by the circulating pump back to the spraying device of the hydration tower for further cyclical spraying; the fume discharged out of the fume outlet passes through a phosphoric acid mist capturing tower and a mist removing and separating tower in turn so that phosphoric acid mist entrained in the fume exiting the hydration tower is further captured, dilute phosphoric acid solution after capture of phosphoric acid mist by the phosphoric acid mist capturing tower and the mist removing and separating tower keeps crossflow of acid solution with the concentrated phosphoric acid solution in the hydration tower via pipeline arrangement; during operation of absorption of phosphorus by hydration, the concentrated phosphoric acid solution in the acid solution cyclical spraying system increases constantly, a surplus portion is filtered to become crude phosphoric acid product, and the crude phosphoric acid product enters a subsequent phosphoric acid refining step; on the other hand, an online water replenishing device is provided to implement online water replenishment for the whole process procedure, and fluorine-containing fume discharged out of the mist removing and separating tower enters a subsequent fluorine recovery step.

14. The method according to claim 13, wherein the spraying device in the hydration tower comprises at least two spraying layers located at different heights of the cavity of the hydration tower, the at least two spraying layers comprise a dilute phosphoric acid spraying layer and a concentrated phosphoric acid spraying layer, and the concentrated phosphoric acid spraying layer is disposed above the dilute phosphoric acid spraying layer; a liquid intake pipe of the concentrated phosphoric acid spraying layer is communicated with the acid solution cyclical spraying system, a liquid intake pipe of the dilute phosphoric acid spraying layer is communicated with a circulating and delivering pipe of the dilute phosphoric acid solution in the phosphoric acid mist capturing tower so as to achieve crossflow of the dilute phosphoric acid solution in the phosphoric acid mist capturing tower to the hydration tower, the acid solution cyclical spraying system is additionally connected, via a pipe, to the phosphoric acid mist capturing tower to enable crossflow of the concentrated phosphoric acid solution in the hydration tower to the phosphoric acid mist capturing tower.

15. The method according to claim 13, wherein the acid cooler is structured in a way that a plurality of heat exchange plates made of modified graphite pipes or stainless steel pipe are arranged in an agitation tank, cyclical cooling water is introduced in the pipes, through agitation the phosphoric acid solution entering the acid cooler forms forced convection and heat exchange on the heat exchange plates; a temperature of the fume exiting the kiln, after passing through heat transfer with the cyclically-sprayed concentrated phosphoric acid solution and the cooling by the water-cooling system in the hydration tower, drops to 75-130° C.; a mass percentage concentration of the cyclically-sprayed concentrated phosphoric acid solution in the hydration tower is in a range 60%-90%, a temperature of the concentrated phosphoric acid solution upon entering the hydration tower is controlled in a range of 50-80° C., and a spraying liquid-gas ratio in the hydration tower is controlled in a range of 1 L/m$^3$-20 L/m$^3$.

16. The method according to claim 15, wherein the phosphoric acid mist capturing tower is a fluid-state reverse-flow washing tower which comprises a washing pipe and a separation tank, fume discharged out of the fume outlet of the hydration tower enters the washing pipe of the phosphoric acid mist capturing tower, the cyclical dilute phosphoric acid solution sprayed from down to up in the washing pipe reversely impinges and contacts with up-down fume flow to establishes a foam area, the fume passes through the foam area and contacts a large-area dilute phosphoric acid liquid surface which updates constantly, capture, polymerization and growth of particles and heat transfer occurs in the foam area; a temperature of the fume, through evaporation of moisture content in the cyclical dilute phosphoric acid solution in a heat insulation manner, further falls to 60-90° C.; gas and liquid in the washing pipe enters the separating tank in the lower portion for gas-liquid separation, cyclical dilute phosphoric acid solution after falling into the bottom of the separating tank is delivered by a circulating pump back to the washing pipe and partly crossflows into the hydration tower; a mass percentage concentration of the cyclically-sprayed dilute phosphoric acid solution in the phosphoric acid mist capturing tower is in a range 10%-50%, a temperature of the dilute phosphoric acid solution is controlled in a range of 40-70° C., and a spraying liquid-gas ratio in the phosphoric acid mist capturing tower is controlled in a range of 3 L/m$^3$-25 L/m$^3$.

17. The method according to claim 16, wherein the fume discharged out of the fume outlet in the phosphoric acid mist capturing tower enters a mist removing and separating tower for further gas-liquid separation, a lower portion of the mist removing and separating tower is designed a phosphoric acid liquid droplet capturing structure similar to a cyclone deduster, a centrifugal force is utilized to capture already grownup phosphoric acid droplets from the fume, a wire mesh demister is mounted at an upper portion of the mist removing and separating tower to further capture not-yet-grownup phosphoric acid mist droplets in the fume; the online water-replenishing device is disposed in the mist removing and separating tower and located above the wire mish demister and also serves as a washing device of the wire mesh demister.

18. The method according to claim 17, wherein the fluorine recovery step includes the following steps:
  (1) introducing the fume discharged out of the mist removing and separating tower and containing fluorine to a primary fluosilicic acid washing pipe of a primary fluorine absorbing tower and then bringing the fume which goes from up to down in sufficient contact with cyclical fluosilicic acid solution sprayed from down to up to perform mass transfer, heat transfer and chemical reaction and produce fluosilicic acid, wherein caloric content in the fume is, through evaporation of moisture content in the cyclical fluosilicic acid solution in a heat insulation manner, partly transferred to water vapor;
  (2) transferring gas and liquid in the primary fluosilicic acid washing pipe to a fluosilicic acid separating tank for gas-liquid separation, wherein gas after separation enters a secondary fluosilicic acid washing pipe of a secondary fluorine absorbing tower through a fume outlet of the primary fluorine absorbing tower, liquid after separation stays in the fluosilicic acid separating tank and is delivered through the cyclical delivering pipe having a circulating pump back to the primary fluosilicic acid washing pipe to perform operation of the above primary fluorine absorption;
  (3) bringing the fume entering the secondary fluosilicic acid washing pipe which goes from up to down in sufficient contact with the cyclical fluosilicic acid solution sprayed from down to up to perform mass transfer, heat transfer and chemical reaction and produce fluosilicic acid, wherein caloric content in the fume is, through heat transfer, partly transferred into the cyclical fluosilicic acid solution;
  (4) transferring gas and liquid in the secondary fluosilicic acid washing pipe to the secondary fluosilicic acid separating tank for gas-liquid separation, wherein the separated gas goes through the fume outlet of the secondary fluorine absorbing tower into a subsequent exhaust gas absorbing tower for treatment, the separated liquid stays in the secondary fluosilicic acid separating tank and is partly delivered via the circulating pump back to the secondary fluosilicic acid washing pipe to perform the operation in the secondary fluorine absorbing step, and partly delivered to the fluosilicic acid separating tank of the primary fluorine absorbing tower;
  (5) as the fluosilicic acid solution in the primary fluorine absorbing tower increases constantly, filtering surplus fluosilicic acid solution to remove silica gel, wherein the filtered fluosilicic acid serves as a by-product.

19. The method according to claim 18, wherein the primary fluorine absorbing tower and the secondary fluorine absorbing tower both employ a liquid-state reverse-flow washing tower, the primary fluorine absorbing tower mainly comprises a fluosilicic acid washing pipe and a fluosilicic acid separating tank, an outlet of the fluosilicic acid washing pipe is communicated with a middle portion of the fluosilicic acid separating tank, a fume outlet is disposed on top of the fluosilicic acid separating tank, a fluosilicic acid solution outlet is disposed on the bottom, and the fluosilicic acid solution outlet is communicated with a nozzle in the fluosilicic acid washing pipe via the circulating and delivering pipe having a circulating pump;

the secondary fluorine absorbing tower mainly comprises a secondary fluosilicic acid washing pipe and a secondary fluosilicic acid separating tank, a fume outlet of the primary fluorine absorbing tower is connected to the secondary fluosilicic acid washing pipe via a pipe, an outlet of the secondary fluosilicic acid washing pipe is communicated with a middle portion of the secondary fluosilicic acid separating tank, a foam removing layer and a fame outlet are disposed on the top of the secondary fluosilicic acid separating tank, a fluosilicic acid solution outlet is disposed on the bottom, and the fluosilicic acid solution outlet is communicated with a nozzle in the secondary fluosilicic acid washing pipe and the fluosilicic acid separating tank in the primary fluorine absorbing tower via the circulating and delivering pipe having a circulating pump;

a mass percentage concentration of the cyclical fluosilicic acid solution used in the primary fluorine absorption is in a range 8%-25%, a temperature of the cyclical fluosilicic acid solution is controlled in a range of 25-65° C., and a spraying liquid-gas ratio is controlled in a range of 3 L/m$^3$-25 L/m$^3$; a mass percentage concentration of the cyclical fluosilicic acid solution used in the secondary fluorine absorption is in a range 0.5%-5%, a temperature of the cyclical fluosilicic acid solution is controlled in a range of 25-60° C., and a spraying liquid-gas ratio is controlled in a range of 3 L/m$^3$-25 L/m$^3$.

* * * * *